US012792547B2

(12) United States Patent
Luttrell et al.

(10) Patent No.: US 12,792,547 B2
(45) Date of Patent: Nov. 10, 2026

(54) PORT ARBITRATION IN SWITCH NETWORKS FOR DATAFLOW COMPUTER SYSTEMS

(71) Applicant: SambaNova Systems, Inc., Palo Alto, CA (US)

(72) Inventors: Mark Luttrell, Palo Alto, CA (US); Manish K. Shah, Austin, TX (US)

(73) Assignee: SambaNova, Palo Alto, CA (US)

( * ) Notice: Subject to any disclaimer, the term of this patent is extended or adjusted under 35 U.S.C. 154(b) by 25 days.

(21) Appl. No.: 18/966,107

(22) Filed: Dec. 2, 2024

(65) Prior Publication Data

US 2025/0094376 A1 Mar. 20, 2025

Related U.S. Application Data

(63) Continuation of application No. 18/097,354, filed on Jan. 16, 2023, now Pat. No. 12,158,855.

(60) Provisional application No. 63/306,055, filed on Feb. 2, 2022, provisional application No. 63/301,452, filed on Jan. 20, 2022.

(51) Int. Cl.
*G06F 13/40* (2006.01)

(52) U.S. Cl.
CPC ...... *G06F 13/4022* (2013.01); *G06F 13/4031* (2013.01)

(58) Field of Classification Search
None
See application file for complete search history.

(56) References Cited

U.S. PATENT DOCUMENTS

| | | | | |
|---|---|---|---|---|
| 7,395,361 | B2 * | 7/2008 | Schaffer | G06F 13/362 711/158 |
| 11,200,096 | B1 * | 12/2021 | Shenbagam | G06F 9/5011 |
| 11,929,940 | B1 | 3/2024 | Featherston et al. | |
| 2001/0050916 | A1 | 12/2001 | Krishna et al. | |

(Continued)

FOREIGN PATENT DOCUMENTS

WO 2010142987 A1 12/2010

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

(Continued)

*Primary Examiner* — Farley Abad
*Assistant Examiner* — Dayton Lewis-Taylor
(74) *Attorney, Agent, or Firm* — FP Patents; Sikander M. Khan; Bruce Young

(57) ABSTRACT

System and method for port arbitration in a switch network for dataflow computing systems, particularly in computer systems having a plurality reconfigurable processing units interconnected using switches. A switch network comprises a switch, a plurality of nodes coupled to the switch, and a Dynamic Equality of Service (DEoS) arbiter. The DEoS arbiter may perform operations to arbitrate among input ports of the switch to make a through-connection. Based on the port DEoS metrics, the arbiter selects an input port of the switch to make a through-connection to an output port of the switch. DEoS metrics may include DES counters, and/or quantization ranges of DEoS counters, associated with the source nodes.

20 Claims, 6 Drawing Sheets

(56) References Cited

U.S. PATENT DOCUMENTS

| | | | | |
|---|---|---|---|---|
| 2006/0080487 | A1 * | 4/2006 | Das | G06F 13/372<br>710/124 |
| 2017/0063697 | A1 * | 3/2017 | Kumar | H04L 47/19 |
| 2018/0278549 | A1 | 9/2018 | Mula et al. | |
| 2019/0238453 | A1 * | 8/2019 | Swarbrick | H04L 67/34 |
| 2020/0218683 | A1 | 7/2020 | Grohoski et al. | |
| 2020/0257643 | A1 | 8/2020 | Grohoski et al. | |
| 2022/0012077 | A1 | 1/2022 | Kumar et al. | |
| 2022/0156213 | A1 | 5/2022 | Grohoski et al. | |
| 2023/0289310 | A1 | 9/2023 | Grohoski et al. | |
| 2023/0409395 | A1 | 12/2023 | Kumar et al. | |

OTHER PUBLICATIONS

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

400A

| SOURCE NODE | DEOS COUNTER | INPUT PORT | QR |
|---|---|---|---|
| A | 2 | 0 | 0 |
| B | 15 | 0 | 3 |
| C | 1 | 1 | 0 |
| D | 7 | 1 | 2 |
| E | 1 | 0 | 1 |
| F | 7 | 0 | 2 |
| G | 3 | 1 | 1 |
| H | 6 | 3 | 2 |

ACTIVITY UPDATES

400B

| SOURCE NODE | DEOS COUNTER | INPUT PORT | QR |
|---|---|---|---|
| A | 1 | 0 | 0 |
| B | 7 | 0 | 2 |
| C | 1 | 1 | 0 |
| D | 7 | 1 | 2 |
| E | 0 | 0 | 0 |
| F | 3 | 0 | 1 |
| G | 3 | 1 | 1 |
| H | 6 | 3 | 2 |

PORT ARBITRATION IN SWITCH NETWORKS FOR DATAFLOW COMPUTER SYSTEMS

PRIORITY CLAIMS

This application is a continuation of U.S. Non-Provisional patent application Ser. No. 18/097,354, filed Jan. 16, 2023, entitled "DYNAMIC EQUALITY OF SERVICE IN A SWITCH NETWORK" which is incorporated by reference herein in its entirety.

This application claims the benefit of U.S. Provisional Patent Application No. 63/301,452 filed Jan. 20, 2022, which is incorporated by reference herein in its entirety.

This application claims the benefit of U.S. Provisional Patent Application No. 63/306,055 filed Feb. 2, 2022, which is incorporated by reference herein in its entirety.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

U.S. patent application Ser. No. 16/239,252, filed Jan. 3, 2019, entitled "VIRTUALIZATION OF A RECONFIGURABLE DATA PROCESSOR," and U.S. patent application Ser. No. 16/922,975, filed Jul. 7, 2020, entitled "RUNTIME VIRTUALIZATION OF RECONFIGURABLE DATA FLOW RESOURCES,".

FIELD OF THE TECHNOLOGY

The technology disclosed relates to switching networks of computing systems. In particular, the technology disclosed relates to arbitrating switching interconnections among ports of a switch. The technology disclosed further relates to switching systems coupled to reconfigurable units of dataflow computing systems using reconfigurable architectures. Such dataflow computing systems can advantageously comprise coarse-grained reconfigurable architectures (CGRAs).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Switch networks commonly employ arbitration mechanisms to select input ports of a switch, receiving data from devices coupled to the switching network, to make a through-connect to transfer the input data to an output port of the switch. The present disclosure relates to arbitrating among input ports of a switch to make a through-connection to an output port of the switch.

BRIEF DESCRIPTION OF THE DRAWINGS

The drawings included in the present disclosure are incorporated into, and form part of, the specification. They illustrate implementations of the present disclosure (hereinafter, "the disclosure) and, along with the description, serve to explain the principles of the disclosure. The drawings are intended to be only illustrative of certain implementations and are not intended to limit the disclosure.

DETAILED DESCRIPTION

Figure 1A:
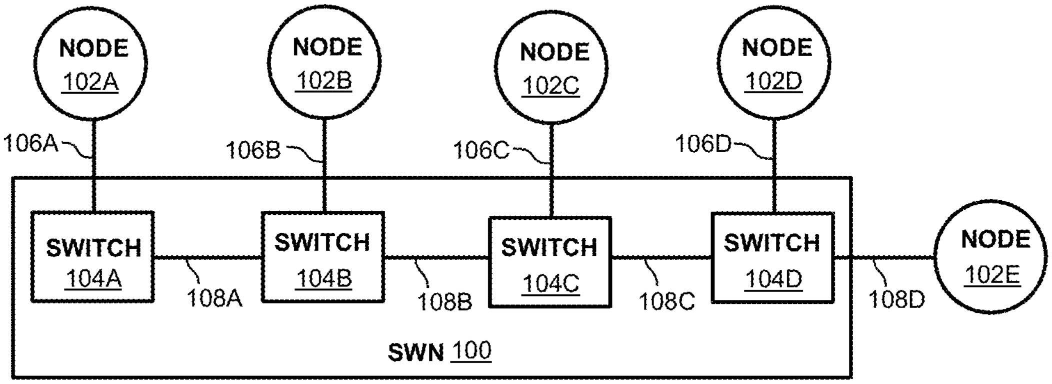
FIG. 1A illustrates an example switch network, according to aspects of the disclosure.

Aspects of the present disclosure (hereinafter, "the disclosure") relate to networks of reconfigurable processing units interconnected using switches. More particular aspects relate to reconfigurable dataflow computing systems (RDSs) and a top level network (TLN) interconnecting nodes of the system. The disclosure illustrates how a computing system, such as an RDS, can employ structures and methods to provide equality of service (EoS) among switches, and/or ports of switches, interconnecting the nodes (e.g., switches and ports of switches forming a TLN).

Aspects of the disclosure can particularly apply to computing systems utilizing processors based on Coarse-Grained Reconfigurable Architectures (CGRAs). Implementations of the disclosure (hereinafter, "implementations") can comprise a system, method, or article of manufacture. One or more features of an implementation can be combined with a base implementation. Implementations that are not mutually exclusive are taught to be combinable. One or more features of an implementation can be combined with other implementations.

The disclosure periodically repeats references to these options. However, omission from some implementations of recitations that repeat these options should not be taken as limiting the combinations taught in the preceding sections—these recitations are hereby incorporated forward by reference into each of the following implementations.

Particular expressions of the disclosure will be understood to have the following operative meanings:

The phrases "at least one"; "one or more"; and "and/or" are to be understood as open-ended expressions that operate both conjunctively and disjunctively. For example, each of the expressions "at least one of A, B, and C", "at least one of A, B, or C", "one or more of A, B, and C", "one or more of A, B, or C", and "one or more of A, B, and or C" means A alone, B alone, C alone, A and B together, A and C together, B and C together, or A, B, and C together.

The term "a" or "an" entity refers to one or more of that entity. As such, the terms "a"/"an", "one or more", and "at least one" can be used interchangeably herein.

The terms "comprising", "including", and "having" can be used interchangeably herein.

As used herein, "incorporated subject matter" refers, collectively, to subject matter disclosed, and/or otherwise encompassed, among the disclosures incorporated herein by reference. For purposes of illustrating the disclosure, but not intended to limit implementations, various terms of the disclosure are drawn from the incorporated subject matter. As used herein, unless expressly stated otherwise, such terms as may be found in the incorporated subject matter have the same meanings, herein, as their meanings in their respective incorporated disclosures.

Aspects of the disclosure can be appreciated through a discussion of particular example applications, methods, and systems. However, such examples are for only purposes of illustrating the disclosure, and not intended to limit implementations. Various modifications to the disclosed examples will be readily apparent to those of ordinary skill in the art, and the general principles defined herein may be applied to other implementations of the disclosure without departing from the spirit and scope of the disclosure.

While implementations of the disclosure are amenable to various modifications and alternative forms, elements of the disclosure are shown by way of example in the drawings and descriptions thereof. It should be understood, however, that the intention is not to limit the disclosure to the particular example implementations described herein, but to encompass all modifications, equivalents, and alternatives falling within the spirit and scope of the disclosure. Thus, the disclosure is not intended to be limited to the implementations shown but is to be accorded the widest scope consistent with the principles and features disclosed herein.

Turning now to more particular aspects of the disclosure, computing problems have emerged that can be characterized by "dataflow" processing, such as machine learning (ML), and deep machine learning (DML) methods of Artificial Intelligence (AI" applications; image processing; stream processing (e.g., processing of streaming video and/or audio data); natural language processing (NLP); and/or recommendation engines. Applications, such as these examples, can lend themselves to parallel (concurrent) processing of their data, such as by pipelining operations on data and/or executing duplicate operations on different data utilizing parallel processors, and can be referred to as "dataflow applications", reflecting a continuous flow of application data through parallel processing resources. Systems designed to execute dataflow applications, and/or process dataflow application data, can be correspondingly referred to as "dataflow systems".

Data of such applications can comprise enormous volumes of data, and the data can be structured (e.g., databases), unstructured (e.g., documents, social media content, image, audio, and/or video), or a combination of these. Data of such applications can be represented for computational processing as, for example, scalars, matrices, and/or tensors. Data of such applications can comprise data of varying data types (e.g., integer, or floating point), size (e.g., 8, 16, 32, or 64 bytes), and/or precisions (e.g., half precisions, full precision, and double precision).

Reconfigurable processors, including field programmable gate arrays FPGAs, can be configured to implement a variety of computational and/or data transfer functions more efficiently or faster than might be achieved using a general purpose processor executing a computer program. However, Coarse-Grained Reconfigurable Architectures (CGRAs) can comprise configurable units that are more complex than those used in typical, more fine-grained FPGAs, and may enable faster or more efficient execution of various classes of applications and/or or application functions. Prabhakar, et al., "Plasticine: A Reconfigurable Architecture for Parallel Patterns," ISCA '17, Jun. 24-28, 2017, Toronto, ON, Canada, (hereinafter, "Prabhakar") describes example CGRAs and, systems utilizing such CGRAs, that can be particularly advantageous in dataflow computing system. Accordingly, aspects of the disclosure relate to methods and systems utilizing reconfigurable dataflow resources, such as resources of a CGRA. However, the disclosure is not necessarily limited to such applications and/or computing systems.

As used herein, the term "CGRA" refers interchangeably to a coarse grain reconfigurable architecture and a computing hardware implementation—such as an integrated circuit, chip, or module—based on, or incorporating, a coarse grain reconfigurable architecture. In implementations, systems based on, and/or incorporating, CGRAs, such as the example of Prabhakar, can be particularly adaptable to, and increasingly efficient in, performing dataflow processing. Hardware resources of a CGRA (e.g., PCUs, PMUs, tiles, networks, and/or network interfaces) can comprise one or more Integrated Circuits (ICs). As used herein, the term "chip" refers to an IC (or, combination of ICs) that can embody elements of a CGRA. A chip can typically be packaged in a chip module (e.g., a single chip module, "SCM" or, alternatively, a multi-chip module, "MCM").

As used herein, the term "reconfigurable dataflow system (RDS)" refers to a computing system that is based on, and/or can utilize, reconfigurable dataflow resources, such as resources of CGRAs, to perform operations of dataflow applications. Owing to reconfigurability, reconfigurable dataflow systems can perform these operations more efficiently than systems comprising fixed or non-reconfigurable resources.

U.S. Nonprovisional patent application Ser. No. 16/239,252, "VIRTUALIZATION OF A RECONFIGURABLE DATA PROCESSOR", to Grohoski, et al, (hereinafter, "Grohoski"), and U.S. Nonprovisional patent application Ser. No. 16/922,975, "RUNTIME VIRTUALIZATION OF RECONFIGURABLE DATA FLOW RESOURCES", to Kumar, et al, (hereinafter, "Kumar"), both incorporated herein by reference, illustrate example implementations of a reconfigurable dataflow architecture and reconfigurable dataflow systems.

Kumar FIG. 1 illustrates example RDS 100 for executing dataflow applications. Dataflow systems, such as the example of RDS 100 (and other examples) in Kumar, can execute application such as AI and/or ML applications, NLP applications, applications for processing unstructured data, and/or applications for stream (e.g., continuous data flow) processing. As illustrated by Kumar (see, for example, Kumar FIG. 16), a reconfigurable data flow system (RDS) can comprise reconfigurable dataflow units (RDUs) comprising, for example, a reconfigurable processor, "RP", 1610 in Kumar FIG. 16), a host processor, a clock circuit, and a memory. According to the examples of Kumar and Grohoski, an RP can comprise an array of CUs with configurable buses. As further illustrated by the examples of Grohoski and Kumar (e.g., Grohoski FIGS. 2 and 3, or Kumar FIGS. 17-20), CUs of RPs can comprise arrays ("tiles") of configurable processing and/or memory units (pattern compute units, "PCUs", and pattern memory units, "PMUs") interconnected by switches.

Figure 3:
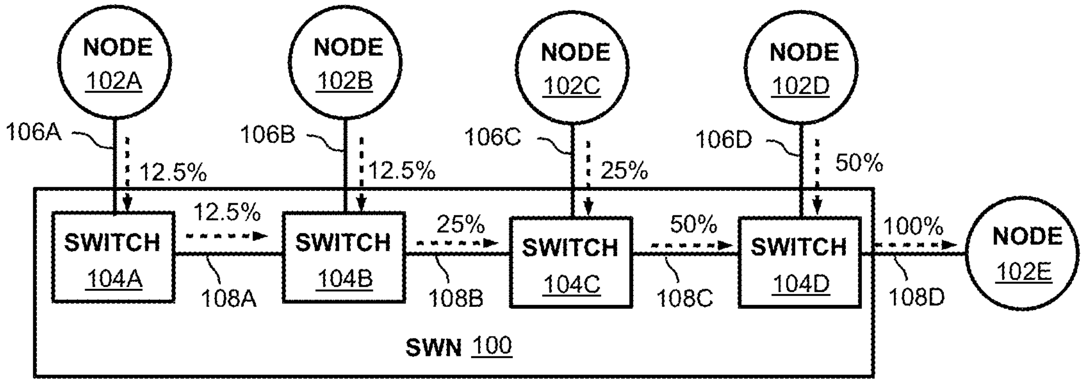
FIG. 3 illustrates an example utilization of the switch network of FIG. 1A, according to aspects of the disclosure.

In implementations, components of an RDS (e.g., host processors, runtime processors, RPs, and/or tiles of CUs) can be advantageously interconnected by switch networks. For example, in an RDS an array level network (ALN) can interconnect CUs (such as an array of PCUs and/or PMUs of a tile) using switches. A TLN can interconnect devices of an RDS, such as tiles, memories, processors, I/O devices, and/or network interface devices, using switches. As used herein, the term "node" refers to a device of a computing system (e.g., a device of an RDS) interconnected to other devices and/or components of the system through a switching network (e.g., an array level network, ALN, or top level network, TLN). For example, Grohoski FIG. 3 illustrates an ALN, 300, interconnecting PCUs and PMUs of a tile using an array of switches. Grohoski FIG. 4 further illustrates TLN 412 interconnecting host 401, memory 402, and AGCUs 420, which in turn couples ALN 411 and CUs 410, via TLN 412, to host 401 and memory 402. In the example of Grohoski FIG. 4, host 401, memory 402, and AGCUs 420 (and, CUs couped by an ALN, such as CUs 410) can be network nodes of TLN 412.

However, this is for only purposes of illustrating the disclosure and not intended to limit implementations. It would be apparent to one of ordinary skill in the art that, within the scope and spirit of the disclosure, a switch network can comprise any variety of networks utilizing switches, such an ALN, a TLN, a local area network, a wide area network, and so forth, at any hardware topological level of a computing system. It would be further apparent to one of ordinary skill in the art that nodes of a switch network can comprise any component of the system coupled to other components of the system, via a switch network, or combination of switch networks (e.g., a combination of TLNs and/or ALNs).

It is to be noted that Drawings of Grohoski use the term "FIG." to refer to figures of the Drawings of Grohoski, and the disclosure similarly uses the term "FIG." to refer to figures of the Drawings of the disclosure. Accordingly, in the ensuing description of the Drawings of the disclosure, except where particularly identified as a drawing of Grohoski (e.g., "FIG. 1 of Grohoski", "Grohoski FIG. 1"), as used herein the term "FIG." refers to figures of Drawings of the disclosure (hereinafter, "the Drawings").

Turning to the Drawings of the disclosure, FIG. 1A depicts a simplified example of a switch network comprising a set of nodes interconnected by switches. In FIG. 1A, each of nodes 102A, 102B, 102C, 102D, and 102E (collectively, "nodes 102") can be, for example, nodes of an RDS such as previously described. In FIG. 1A, nodes 102 are shown interconnected through switch network SWN 100. SWN 100 is shown comprising switches 104A, 104B, 104C, and 104D (collectively, "switches 104) connected to nodes 102 via respective links 106A, 106B, 106C, and 106D (collectively, "links 106"). FIG. 1A further illustrates each of switches 104 connected to a respective successor and/or predecessor switch via links 108A, 108B, 108C, and 108D (collectively, "links 108").

In implementations, SWN 100 can be any form of switch network such as just described; for example, SWN 100 can be a TLN, an ALN, and/or combination of TLN(s) and ALN(s). Links 106 can be any form of computing communications interface suitable to communicatively couple nodes to switches (e.g. to couple nodes to ports of switches), such as memory buses, processor fabric buses, PCI buses, PCI-Express links, InfiniBand links, etc. While not shown in FIG. 1A, nodes and/or switches in FIG. 1A can include interface adapters (e.g., AGCUs of a tile, fabric adapters, PCI, PCI-Express, or InfiniBand adapters) to couple the nodes/switches to links 106.

Figure 1B:
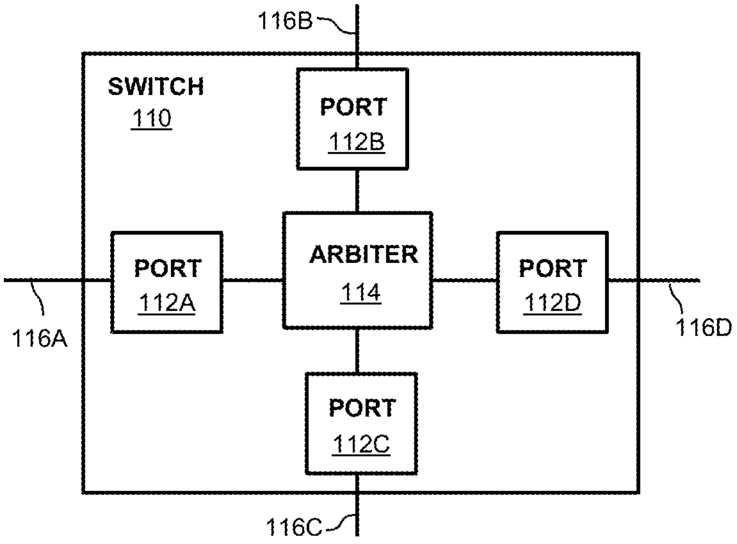
FIG. 1B illustrates an example switch, according to aspects of the disclosure.

FIG. 1B illustrates example switch 110 comprising ports 112A, 112B, 112C, and port 112D (collectively, "ports 112"); links 116A, 116B, 116C, and 116D (collectively, "links 116"); and, arbiter 114. Switches 104 in FIG. 1A can comprise switches such as switch 110 and links 108A-108D, in FIG. 1A, can connect to respective ports among ports 112 by connecting links 106 to links 116. In FIG. 1A, links 106 and links 116, in FIG. 1B, can be the same links, or can be links coupled by an interface circuit or bridge (not shown in FIGS. 1A and 1B) between links among 106 and corresponding links among links 116. Ports among ports 112 can, similarly, connect to switches of other networks. For example, one switch, similar to switch 110, can be included in a TLN and a second switch similar to switch 110 can be included in a second TLN. A link, such as link 116D of switch 110 in FIG. 1B, can connect the first switch, to the second switch (e.g., via a port of the second switch connected to the link) to interconnect the first TLN to the second TLN.

While FIG. 1B depicts each of switch 110 having 4 ports, this is only to illustrate the disclosure and not intended to limit implementations. It would be apparent to one of ordinary skill in the art that switches of a switch network can have any number of input ports, output ports, or combinations of input and output ports, greater than the 4 illustrated in FIG. 1B. Additionally, while examples of the disclosure are frequently described with reference to switches of switch networks, such as switch 110, comprising packet switches, this is also not intended to limit implementations and it would be apparent to one of ordinary skill in the art that structures and methods of the disclosure can apply to other forms of switches, such as circuit switches.

In implementations, ports among ports 112 can function as input ports, which can receive input data from a link, and/or can function as output ports, which can send data from the switch onto a link. As used herein, the term "input port" refers to a port of a switch (or, a portion thereof) that receives input data from an input link, and the term "output port" refers to a port of a switch (or, a portion thereof) that outputs data from the switch to an output link. In FIG. 1B, each port among ports 112 can include or, be coupled to, a data buffer (not shown explicitly in FIG. 3) to operate as an input port, to receive input data from a node or another switch, and/or to operate as an output port to transmit data, via an output port of the switch, to a node or another switch.

A "source node" of a switch network (e.g., a source node of a TLN) can be any device or system that can input data into the network. For example, in FIG. 1A nodes among nodes 102 can be source nodes of SWN 100, such as AGCUs, switches of tiles, memory interfaces (e.g., a DDR interface), switches of I/O interfaces (e.g., PCI-E switches and/or link configurations, such as PCI-E and/or InfiniBand links), switch networks and/or switches of switch networks, and/or data bus interfaces.

In FIG. 1A, links 106 and/or 108 can connect to respective input and/or output ports of switches 104. Via links 106, ports of the switches 104 can receive input data from each of the respectively connected nodes among 102; and, via links 108, ports of switches 104 can propagate the input data, through switch SWN 100, to other nodes among nodes 102. For purposes of illustrating the disclosure, ports of switches 104 (not shown explicitly in FIG. 1A) can be distinguished in reference to their connected links, such as "port 106A" referring to a port of switch 104A connected link 106A, and "port 108A" referring to a port of switch 104A, and/or 104B, connected link 108A. Similarly, "ports 106" can refer, collectively, to ports of switches 104 connected to links 106, and "ports 108" can refer, collectively, to ports of switches 104 connected to links 108.

A port arbiter (hereinafter, for brevity, simply "arbiter") can determine and/or configure a switch to enable one or more input ports of the switch to make a "through-connection" to transfer data received from the input port(s) to an output port of the switch. As used herein, the term "through-connection" refers to a connection, through a switch, that transfers data received on an input port of the switch to an output port of the switch for sending the data forward to another switch or node of a switch network. In implementations, an arbiter can be a component of a switch, as illustrated in FIG. 1B, can be a component of a switch network, such as a component (not shown in FIG. 1A) of SWN 100 in FIG. 1A, and/or can be a component of a system utilizing a switch network (e.g., a component of an RDS).

Using a through-connection, an input port of a switch (e.g., a port such as among ports 112 in FIG. 1B) can receive input data (e.g., a data "packet") from an input link connected to the input port and, internal to the switch (e.g., using a crossbar), can forward or otherwise transfer the data to an output port, to send the data forward through the network to a destination node on an output link connected to the output port. For example, arbiter 114 can configure switch 110 to make a through-connection among ports 112, such as a through connection of port 112A, 112B, or 112C, operating as an input port, to port 112D, operating as an output port.

An arbiter can cyclically select one or more input ports of a switch to make a through-connection to an output port of the switch. The arbiter can make the selection(s) so at particular time intervals that can comprise an "arbitration cycle". In an arbitration cycle, the arbiter can select an input port to make a through-connection to an output port or, alternatively, can permit a previously selected input port to continue to make a through-connection to an output port. For example, in FIG. 1A each of switches 104 can be similar to switch 110 in FIG. 1B, and can include an arbiter that can arbitrate input ports of the respective switch (alternatively, the network of switches 104 can include an arbiter that manages some or all of switches 104).

Using switch 110 of FIG. 1B, for example, during an arbitration cycle of switch 110 arbiter 114 can select from among ports 112, operating as input ports, to establish a through-connection to a port, among ports 112, operating as an output port. The selected input port can then utilize the through-connection to transfer input data received at that input port to an output port that can send the data from, or through, the output port. The arbiter can then repeat selection of an input port, among the input ports of the switch, to select the same or an alternative input port of the switch to connect to the output port.

Figure 1C:
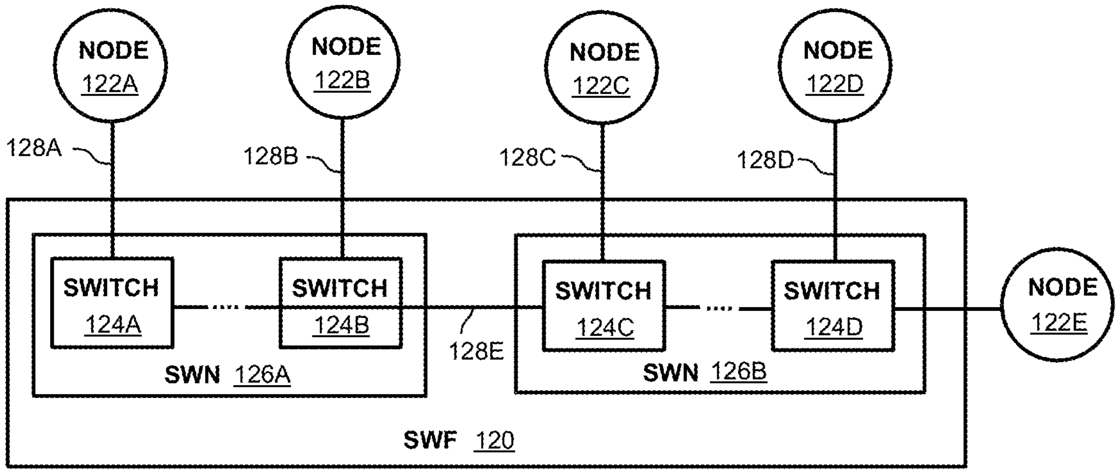
FIG. 1C illustrates an example switch fabric, according to aspects of the disclosure.

A "switching fabric" can comprise a plurality of switch networks, such as node 102E. For example, with reference to the examples of Grohoski, a switching fabric can comprise a plurality of ALNs coupled by one or more TLNs, and/or a plurality of communicatively coupled TLNs. FIG. 1C illustrates example switch fabric coupling nodes 122A, 122B, 122C, 122D, and 122E (collectively, "nodes 122"). In FIG. 1C, SWF 120 is shown comprising switch networks SWN 126A and SWN 126B coupled to each other via link 128E. SWN 126A and/or SWN 126B can be, for example, switch networks similar to SWN 100 of FIG. 1A, and can receive input data from, and/or send output data to, nodes among nodes 122 via respective links 128A, 128B, 128C, and 128D. Links among links 128A-128E (collectively, "links 128") can be links similar, for example, to links among links 106 of FIG. 1A.

In FIG. 1C, nodes 122 can communicate via respective links among links 128A-128D via SWN 126A and SWN 126B and SWF 120. Via link 128E switches 124A and 124B, of SWN 126A, can pass (forward) or receive data to/from switches 124C and 124D of SWN 126B to facilitate transfer of data among nodes 122. As used herein, then, the term "switch network" refers equally to a switch fabric comprising a plurality of communicatively coupled switch networks.

Figure 1D:
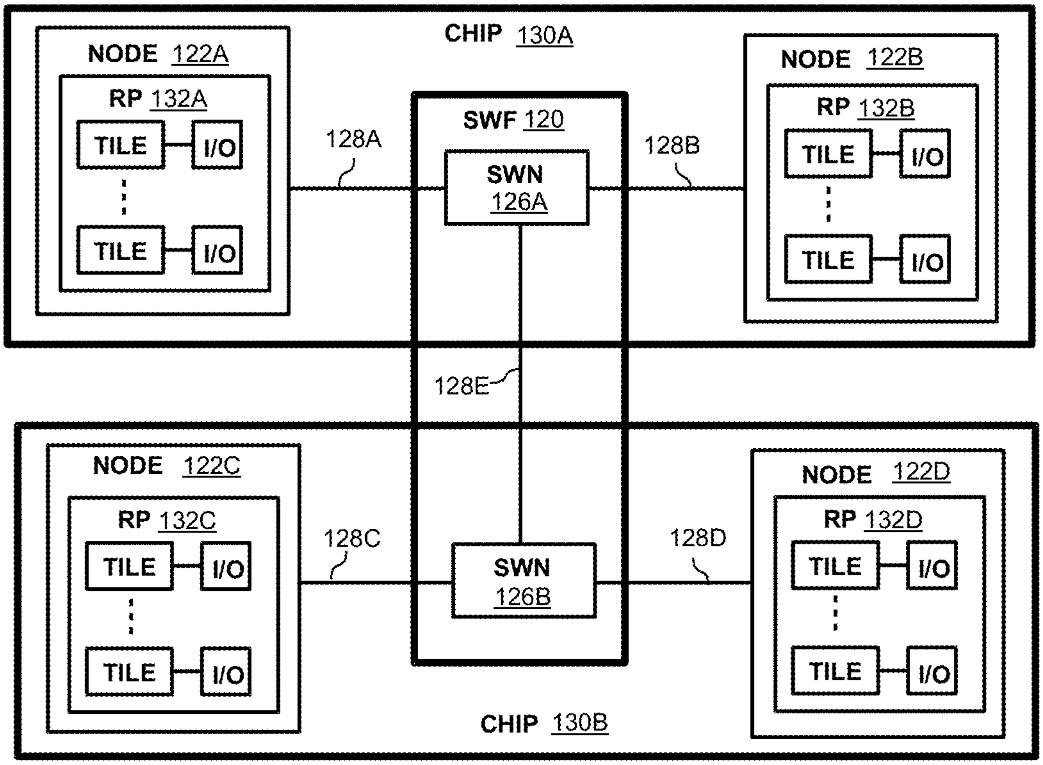
FIG. 1D illustrates an example on-chip network, according to aspects of the disclosure.

In implementations, nodes of a switch network can comprise components of a "chip" (e.g., an integrated circuit, such as an ASIC) and a switch network can comprise an "on-chip" network integrated on a chip with nodes of the network. FIG. 1D illustrates an example of a chip comprising nodes and an on-chip switching network. The example of FIG. 1C can comprise, for example, components of a chip. Therefore, for only purposes of illustrating the example, FIG. 1D illustrates an on-chip network and fabric using the example nodes 122, links 128, switch fabric SWF 120, and switch networks SWN 128A and SWN 128B, of FIG. 1C. However, this for only purposes of illustrating the disclosure and not intended to limit implementations. It would be apparent to one of ordinary skill in the art that an on-chip network can comprise components other than as illustrated in FIGS. 1C and/or 1D, and in configurations and/or arrangements other than as illustrated in FIGS. 1C and/or 1D.

In FIG. 1D, chip 130A and 130B (hereinafter, collectively, "chips 130") can be chips that integrate nodes of a switching network, the switch network, and elements of a switching fabric. FIG. 1D illustrates chip 130A comprising node 122A and node 122B of FIG. 1C, and chip 130B comprising node 122C and node 122D of FIG. 1C. In FIG. 1D, chip 130A further comprises SWN 126A, of FIG. 1C, and chip 130B further comprises SWN 126B, of FIG. 1C. In FIG. 1D, nodes 122 are shown comprising reconfigurable processors, with node 122A comprising RP 132A, node 122B comprising RP 132B, node 122C comprising RP 132C, and node 122D comprising RP 132D. As illustrated in FIG. 1D, the RPs can comprise tiles and I/O interfaces.

Links 128A and 128B, of FIG. 1C, are shown in FIG. 1D respectively coupling node 122A and node 122B to SWN 126A, and links 128C and 128D, of FIG. 1C respectively coupling node 122C and node 122D to SWN 126B. I/O interfaces of the nodes 122A-122D, in FIG. 1D, can comprise I/O interfaces of respective links 128A-128D. In implementations, SWN 126A and SWN 126B can comprise, for example, an on-chip ALN and/or TLN, such as illustrated in the examples of Grohoski and Kumar. I/O interfaces of the nodes can comprise, for example, AGCUs and/or PCI-Express interfaces. While not shown in FIG. 1D, an ALN can be a switching network (in the example of FIG. 1D, an on-chip network) to interconnect tiles within an RP, and the ALN can comprise an arbiter such as disclosed herein.

SWF 120, of FIG. 1C, is shown in FIG. 1D comprising SWN 126A of chip 130A and SWN 126B of chip 130B coupled by link 128E, as also illustrated in FIG. 1C. Chips 130A and 130B can be chips of, for example, a single chip module (SCM) and link 128E can comprise an inter-chip link of SWF 120. Alternatively, chips 130A and 130B can be chips of, for example, a multi-chip module (MCM) and link 128E can comprise an intra-chip link. Link 128E, in FIG. 1D, can comprise a link such as previously described with reference to link 128E in FIG. 1C. While FIG. 1D depicts SWN 126A as a component of chip 130A, and SWN 126B as a component of chip 130B, in alternative implementations, SWN 126A and SWN 126B can be components of only chip 130A or 130B, and links among links 128A-128D can be inter-chip links coupling respective nodes 122A-122D to SWN 126A or SWN 126B on one of chips 130A and 130B. In such implementations, SWF 120 can comprise a component of one of chips 130A and 130B, based both SWN 126A and SWN 126B integrated on one of chips 130A and 130B. While not shown in FIG. 1D, SWF 120 can comprise As illustrated in FIG. 1D, as SWF 120 comprises SWN 126A on chip 130A and SWN 126B on chip 130B, SWF 120 can comprise an "off-chip" network. While not shown in FIG. 1D, SWF 120 can comprise switching networks, which can be similar or equivalent to SWNs 126A and/or SWN 126B, integrated on a chip (and/or other electronic circuit) additional to chips 130A and 130B. An off-chip network can comprise, for example, PCI-Express, InfiniBand, and/or ethernet networks and/or links.

Figure 2:
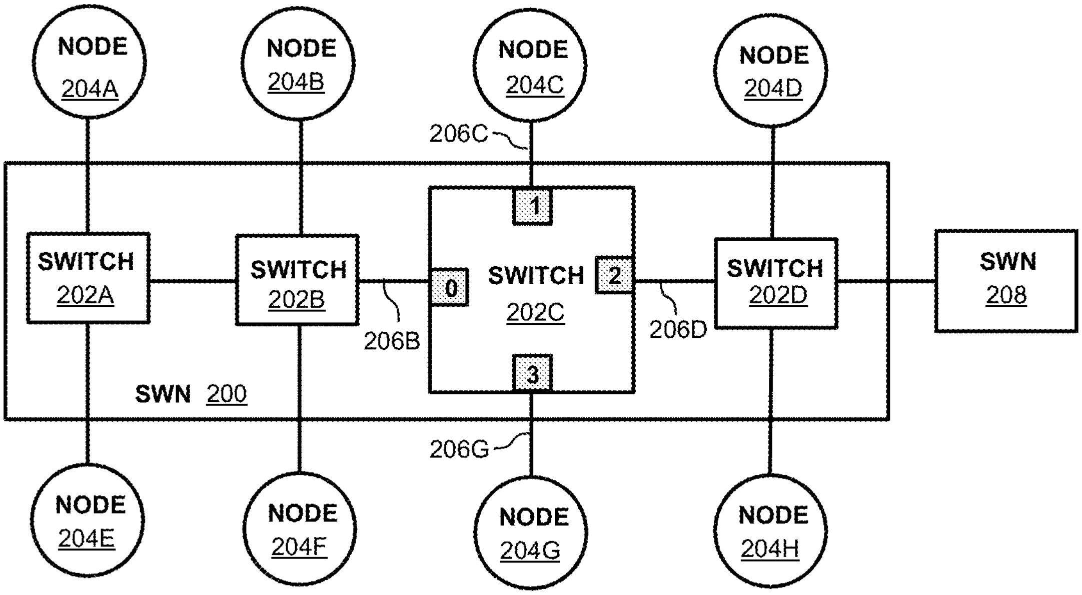
FIG. 2 illustrates arbitrating ports of a switch of a switch network, according to aspects of the disclosure.

In the examples of FIGS. 1A-1C, an arbiter of a switch can arbitrate among input ports of the switch to establish a through-connection to an output port of the switch. To further illustrate arbitrating among input ports of a switch, FIG. 2 illustrates another example switch network and ports of an example switch of the network. In FIG. 2, example switch network SWN 200 is shown coupled to nodes 204A, 204B, 204C, 204D, 204E, 204F, 204G, and 204H (collectively, "nodes 204") and SWN 208. FIG. 1 further depicts SWN 208 comprising switches 202A, 202B, 202C, and 202D (collectively, "switches 202"). In implementations, SWN 202 and/or SWN 208 can comprise, for example, a switch network such as SWN 100. SWN 200 can comprise switches such as switches among switches 202. While not shown in FIG. 2, SWN 208 can be coupled to nodes similar to nodes 204 and, collectively, SWN 200 and SWN 208 can form a switch fabric for a plurality of nodes (e.g., nodes of an RDS). Nodes of SWN 200 and 208 can be source nodes that can input data into switches among switches 202 and/or switches of SWN 208 (not shown in FIG. 2).

FIG. 2 particularly depicts nodes 204C and 204G coupled to switch 202C, and switch 202C comprising ports 0, 1, 2, and 3. Nodes 204C and 204G are coupled to respective switch ports 1 and 3, of switch 202C, via respective links 206C and 206G. Switch 202B is coupled to port 0 of switch 202C via link 206B, and to switch 202D via link 206D. In implementations, links 206C and 206G can be, for example, links to connect nodes to a switch network such as described in reference to FIG. 1A (e.g., PCI-Express or InfiniBand links to a TLN). Links 206B and 206D can be similar links or, alternatively, can be any form of data communications links suitable to internally couple switches 202 among each other. While not shown in this detail, switches 202A, 202B, and 202D can be switches similar to switch 202C, comprising 4 ports, 0-3 (or, even more ports). Nodes among nodes 204 can be source nodes of SWN 200, such as previously described with reference to nodes 102 of FIG. 1A.

As can be seen from this example, ports 1 and 3 of switch 202D can receive (via links 206C and 206G) data input into SWN 200 from nodes 204C and 204G. However, via link 206B and switches 202A and 202B, port 0 of switch 202C can further be a recipient of data input into SWN 200 from nodes 204A, 204B, 204E, and 204F. Thus, a total of 6 nodes of SWN 200 can be source nodes to input data into switch 202C (at ports 0, 1, and 3) for forwarding, for example, to port 2 of switch 202C. Similarly, switch 202D can receive (data input into SWN 200 from nodes 204D and 204H and, via link 206D, switch 202D can further be a recipient of data input into SWN 200 from nodes 204A, 204B, 204C, 204E, 204F, and 204G, for a total of 8 source nodes that can input data into switch 202D for forwarding to an output port of switch 202D (e.g., an output port coupled to SWN 208).

A technical problem that can occur with switch networks is assuring sufficient "service" to each of the nodes connected to the same switch, and/or switch network, to meet the data transfer requirements (e.g., rate or amount of data to transfer) of particular nodes to other nodes connected to the switch network. FIG. 3 uses the example of SWN 100, in FIG. 1A, to illustrate one such "equality of service (EoS)" problems in switch networks, in which some nodes can get a lower level of data transfer service, through a particular switch and, consequently, through the network, compared to others.

In FIG. 3, nodes 102A-102D can be configured, for example, to transmit data (e.g., application data, and/or results of processing application data) to node 102E via SWN 100, as indicated by the broken arrows in the direction of data transferred among the nodes. To select an input port for a through-connection, an arbiter of a switch (or, of a network of switches) can perform, for example, a "round robin" selection. In a round robin selection, an arbiter can utilize a round robin "pointer" (RRP) to indicate a particular input port currently using, last using, or next to use a through-connection to an output port. At the start of an arbitration cycle, the arbiter selects the input port indicated by the RRP, makes a through-connection from the input port to an output port, and then updates (e.g., increments) the RRP to select another input port at the start of the next arbitration cycle.

However, in a switch network, different source nodes can have differing amounts, and/or differing rates, of data to transfer to destination nodes connected to the switch network. For example, in FIG. 3, individual nodes among 102A-102D can have differing amounts and/or rates of data to transfer to node 102E through SWN 100. In granting each input port of a switch (and, correspondingly, a node connected to that input port) a through-connection, a simple RR arbitration can produce an unequal service (e.g., number and/or duration of a through-connection) among nodes connected to a switch network, relative to their data transfer requirements.

To illustrate more particularly, consider that an arbiter of each of switches 104, in FIG. 3, uses a RR arbitration scheme to connect an input port to an output port of the respective switch. Looking first to switch 104D, using RR arbitration the arbiter of switch 104D can provide each of links 106D and 108C, while inputting data to switch 104D, with 50% of the through-connection service of switch 104D. Arbiters of switches 104B and 104C can similarly, using RR arbitration provide each of respective links 106B and 108A, and 106C and 108B, while inputting data to switches 104B and 104C, respectively, with 50% of the through-connection service of switches 104B and 104C. However, each of nodes 102C, 102B, and 102A are progressively limited by the available utilization of the links from their respectively connected switches, receiving, respectively, 25%, 12.5%, and 12.5% of the available data transfer capacity of the switch network.

In a "weighted" round robin (WRR) method of arbitration, an arbiter can apply a weight to each input port of a switch and grant through-connections to input ports based on the relative weights of the source nodes/input ports. In a WRR arbitration scheme, a weight can be a "global") weight associated with an aggregate number of source nodes that can input data to a switch on each input port of the switch. The global weight of each input port of a switch can correspond, for example, to the total number of "upstream" nodes that can input data into that switch port. A WRR arbitration scheme can (successively) allocate a through-connection to a particular input port for a number of arbitration cycles based on the weight associated with the source node connected to each input port of a switch.

As in RR arbitration methods, in a WRR arbitration method an arbiter can maintain an RRP to point to a next input port of a switch to make a through-connection. In successive arbitration cycles, and can select an input port to make a through-connection based on a current value of the RRP, and can update the RRP (and/or associated source node/input port weights) based on the selected port having made the through-connection for a number of arbitration cycles associated with the weight associated with the source node coupled to the selected port.

A WRR arbitration method can efficiently improve EoS if the connected nodes have predictable and/or consistent data transmission characteristics through a network. However, in a switch network some nodes can input more data through the network, and/or input data at higher data rates into the network, than other nodes, and these amounts and rates of data input can vary over time and in unpredictable ways. For example, in FIG. 1A, node 102D may send data to node 102E only infrequently, while node 102C may frequently send to node 102E. In this example, using RR or WRR arbitration a n arbiter can allocate switch service (e.g., switch through-connections and/or switch bandwidth) to node 102D disproportionately high compared to the rate and/or amount of data node 102D inputs into SWN 100, while allocating node 102C service disproportionately low compared to the rate and/or amount of data node 102C inputs into SWN 100. Thus, port arbitration based on RR or WRR methods can fail to provide switch service to nodes corresponding to their dynamic utilization of (e.g., data input into) the switch network.

Disproportionate allocation of switch service can result in input ports of switches that are unutilized for sending data at particular times. Disproportionate allocation of switch service can affect overall performance (e.g., processing throughput and/or latency) of applications processed by a computing system (e.g., applications processed by an RDS), and/or can result in underutilization of other resources of a computing system (e.g., underutilization of RDUs of an RDS).

Thus, it is advantageous for a switch network (and/or switch fabric) to utilize a Dynamic Equality of Service (DEoS) method of arbitrating among input ports of a switch. Using DEoS arbitration, a DEoS arbiter of a switch can arbitrate among input ports of a switch to allocate through-connections to the input ports in response to dynamic activity (e.g., rate or amount of data input into the switch) of source nodes connected to the switch and/or to a switch network. In implementations, a DEoS arbiter can be a component of a switch, or of a switch network, to allocate through-connections among ports of switches included in a switch network or switch fabric. A DEoS arbiter can be alternatively, or additionally, a component of a computing system utilizing a switch, or switch network, to arbitrate among ports of switches included in the switch network to allocate through-connections. Such a DEoS arbiter can comprise a processor, a memory, specialized switch arbitration circuits, and/or firmware or software programs. Firmware and/or software programs can execute, for example, on processors of a switch and/or a processor of an RDU.

In implementations, DEoS metrics can correspond to dynamic (changing over a period of time) data input activity of source nodes into input ports of a switch, as data input activity of source nodes into input ports of a switch can vary over time. A DEoS arbiter can compute, or utilize, DEoS metrics corresponding to dynamic data input activity of source nodes into input ports of a switch to arbitrate among input ports to make through-connections to output ports of the switch. Based on DEoS metrics of individual input ports, a DEoS arbiter can select an input port, and/or update an RRP, during or, in conjunction with, an arbitration cycle of a switch.

DEoS metrics can comprise node and/or port DEoS metrics. In implementations, node DEoS metrics can be associated with data input activity of particular source nodes of a switch network or fabric into input ports of the switch. A node DEoS metric can comprise, for example, a rate of data input (e.g., a number of data packets input over a period of time) by a source node into a switch input port. A node DEoS metric can comprise an amount of data input by a source node into a switch input port over time (e.g., a number of bytes), or a combination of a rate and an amount of data input into a switch input port, over time, by a particular source node.

A node DEoS metric can comprise, for example, a DEoS counter associated with dynamic data input by source node, over time, into a particular input port of a switch. For each input port of a switch, a DEoS arbiter can compute a DEoS counter value for each source node that can input data into the respective input port(s). A DEoS counter can be a count, for example, of a number of data packets, and/or an amount, of data input by an associated source node into a particular switch input port. A DEoS arbiter can increase (count up from a minimum value) and/or decrease (count down from a maximum value) a particular DEoS counter as the arbiter detects data input to an input port by a particular (associated) source node of a switch network. A DEoS counter (as an example node DEoS metric) can thereby indicate cumulative source node input activity of a source node over a period of time and, can indicate a corresponding switch service requirement (through-connections through to an output port) of that source node compared to other source nodes inputting data to the same or other input ports of a switch.

Based on node DEoS metrics associated with source nodes inputting data to a particular input port, a DEoS arbiter can compute a port DEoS metric corresponding to aggregate dynamic data input activity of source nodes, over time, into that input port. The port DEoS can thereby indicate a dynamic aggregate switch service requirement (through-connections to an output port) of a plurality of the source nodes inputting data to an input port compared to dynamic aggregate service requirements of other input ports of a switch.

In arbitrating among input ports of a switch to make a through-connection, a DEoS arbiter can select an input port, and/or update an RRP based on port DEoS metrics of the input ports. During or, in conjunction with, an arbitration cycle of a switch a DEoS arbiter can utilize dynamically computed port DEoS metrics to balance switch service (e.g., allocation of through connections to the input ports) among the input ports to correspond to the dynamic aggregate service requirements of the input ports of the switch.

Referring again to example SWN 200 of FIG. 2, a DEoS arbiter can, for example, compute a port DEoS metric for each of ports 0-3 of switch 202C, based on dynamic data input activity of nodes 204 to the respective ports of switch 202C. The DEoS arbiter can select, for example, one of ports 0-2 to make a through-connection to port 3 of switch 202C based on comparative dynamically computed port DEoS metrics of ports 0-2. The dynamically computed port DEoS metrics of the input ports can increase or decrease, as the activity of source nodes inputting data into individual input ports increases and/or decreases over time and serve the DEoS arbiter to select input ports for through-connections proportional to their dynamic switch service requirements.

In implementations, one example port DEoS metric can be a "port DEoS weight". A DEoS arbiter can compute a port DEoS weight for each of the input ports of a switch based, for example, on associated source node DEoS counters. For example, a DEoS arbiter can compute a port DEoS weight as a sum of the DEoS counters of all source nodes inputting data into respective input ports of the switch. The DEoS arbiter can select an input port to make a through-connection (e.g., during an arbitration cycle) based on the comparative port DEoS weights of the input ports.

In this example, however, summing a set of DEoS counters can require summation circuits of a DEoS arbiter (or, of a switch) that can require a relatively larger number of bits and, correspondingly, a more complex arithmetic unit to perform the summation of the DEoS counters. In implementations, the size of a counter can correlate, for example, to an amount of inputs from source nodes ("input events") to record over a particular period of time (a history of input events). Thus, an implementation can utilize counters of 6, 7, or 8 bits to record up to 63, 127, or 255 input events at each input node. As a switching network, or fabric of switching networks, can comprise many nodes (e.g., 64 or 128 nodes), summation circuits to sum a set of counters associated with many nodes inputting to a particular input port can require very large adder/accumulator circuits.

To simplify such summation circuits, in implementations a DEoS arbiter can associate a quantization range (QR) with values of DEoS counter values. A QR can correspond to a range of values of DEoS counters, and differing QR values can correspond to differing DEoS counter value ranges. For example, QR value '0' can correspond to a range of low values of DEoS counters (e.g., counter values from 0 to 3), QR value '1' can correspond to a range of lower intermediate values of DEoS counters (e.g., counter values from 4 to 7), QR value '2' can correspond to a range of higher intermediate values of DEoS counters (e.g., counter values from 7 to 15), and QR value '3' can correspond to a range of higher intermediate values of DEoS counters (e.g., counter values from 15 to 63).

In this example, it requires only 2-bit QR values to represent the 4 differing QRs. By compressing DEoS counters to smaller bit-size QR values, a DEoS arbiter can compute, for example, a port DEoS weight for each of a set of switch input ports utilizing summation circuits having many fewer bits than computing such a weight as a sum of DEoS counters of the input ports. For example, using a 2-bit QR, summing QRs for as many as 64 source nodes of an input port requires only 8 bits (e.g., to sum 64 source nodes times a maximum QR value of 3) to sum QR values for each input port, as compared to 12 bits to sum 64 6-bit DEoS counters. Thus, such a QR value, and a port DEoS weight comprising a sum of source node QR values, can reduce the number of bits, and complexity, of summation circuitry to compute a port DEoS weight of each of the input ports of the switch.

In implementations, QRs having higher QR values can, for example, correspond to a range of relatively higher DEoS counter values while QRs having lower QR values can correspond to a range of relatively lower DEoS counter values. The higher QR values can then indicate source nodes having higher switch input activity compared to source nodes at the same, or another, input port having lower associated QR values. In choosing QRs a DEoS arbiter can choose uniformly sized DEoS counter ranges (e.g., each of 4 QRs corresponding to ¼ of the range of DEoS counter values) or, alternatively, as illustrated by the foregoing example QRs, can choose non-uniformly sized ranges of DEoS counters.

Figure 4A:
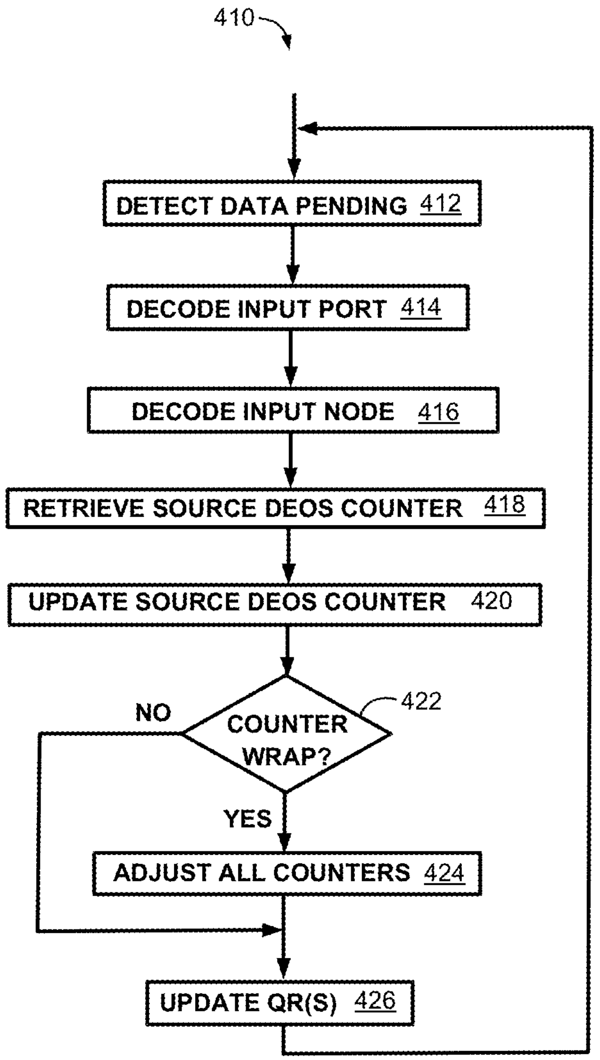
FIG. 4A illustrates an example method for determining Dynamic Equality of Service (DEoS) metrics and Round Robin Pointers (RRPs) associated with nodes of a switch network, and input ports of a switch, according to aspects of the disclosure.

FIG. 4A illustrates an example method, 410, that a DEoS arbiter can perform to determine DEoS counters and QRs associated with source nodes of a switch network. In implementations a DEoS arbiter can perform a method, such as 410, as a part of performing an arbitration cycle, and/or in conjunction (e.g., in the background, or in parallel with) the arbiter making a through-connection and/or the switch transferring data from an input port to an output port.

As previously described, a DEoS arbiter of a switch can be included in an individual switch of a switch network, such as a DEoS arbiter included in switch 202C of FIG. 2. Thus, for purposes only of illustrating method 410, but not intended to limit implementations, the method is described using the example of SNW 200 and switch 202C in FIG. 2. Also as previously described, switch 202C can be similar to switch 110 of FIG. 1B. Thus, in the description of method 410, "the switch" refers to example switch 202C in FIG. 2. Also, for only purposes of illustrating the method, but not intended to limit implementations, the method is described as performed by a DEoS arbiter of switch 202C to select an input port among ports 0, 1, and 3 for a through-connection to port 2 (e.g., to send data to nodes 204D and/or 204C in FIG. 2). As used in describing method 410, "the arbiter", then, refers to a DEoS arbiter of switch 202C, according to implementations of a DEoS arbiter such as previously described.

Figures 4B, 4C:
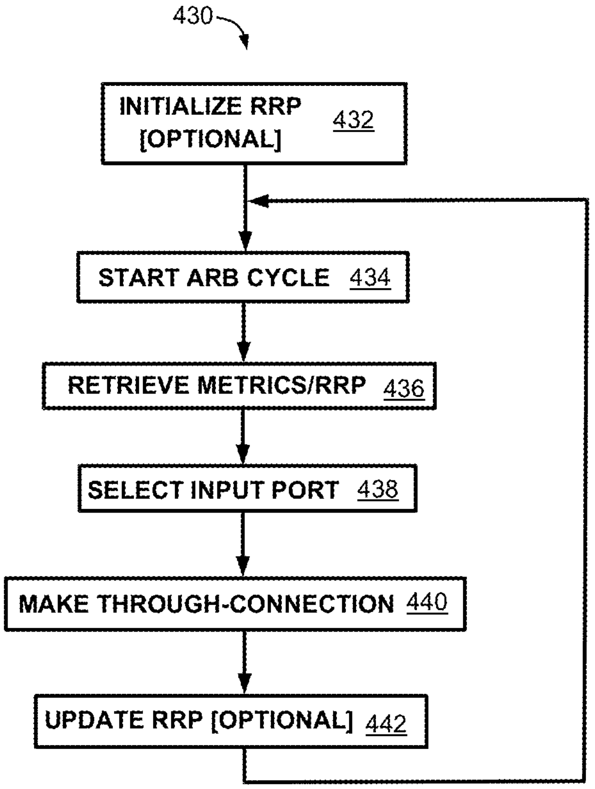
FIG. 4B illustrates example DEoS metrics, according to aspects of the disclosure.
FIG. 4C illustrates an arbitration cycle, according to aspects of the disclosure.

In describing method 410 herein, reference is made to table 400A and table 400B (collectively, "Tables 400"), of FIG. 4B, to illustrate example DEoS counter and QRs values that can be associated with each of the source nodes that can input data to switch 202C. Using the example of SWN 200 and switch 202C, in FIG. 2, for reference, FIG. 4B illustrates example DEoS counters and QRs that a DEoS arbiter can utilize to perform a method similar or equivalent to method 410. In FIG. 4B, Table 400A illustrates values of DEoS counters and QR values at one particular time, and table 400B illustrates an example result of the arbiter modifying DEoS counters and/or QRs, of Table 400A, based on dynamic activity of source nodes inputting data into input ports of switch 202C. The DEoS counters and QRs of each of Tables 400 can comprise values determined, by a DEoS arbiter, after some number of arbitration cycles and/or through-connections of the input ports of switch 202C.

In implementations, QRs can correspond to ranges of DEoS counters indicative of higher or lower source node input activity. For example, a higher QR value can correspond to a wider range of higher value DEoS counters compared to a range of DEoS counter values represented by a lower QR value. In this way, the QRs can skew toward higher activity input ports and, based on lower QR values, for example, during input port arbitration a DEoS arbiter can de-prioritize lower activity ports for selection to make through-connections.

In Tables 400, the SOURCE NODE column identifies each source node that can input data to switch 202C on one of ports 0, 1, and 3, in which SOURCE NODEs A-H correspond to nodes 204A-204H, respectively, in FIG. 2. In Tables 400, the INPUT PORT column identifies the particular input ports over which the source nodes of the SOURCE NODE column can input data to switch 202C. For example, in Tables 400, source nodes A, B, E, and F—corresponding to nodes 204A, 204B, 204E, and 204F, respectively, of FIG. 4A—can input data on port 0 of switch 202C. The DEoS Counter and QR columns record, respectively, a DEoS count value and QR value determined from that DEoS counter value, for each source node in the SOURCE NODE columns.

Turning now to details of example method 410, in operation 412, the arbiter detects input data received from a source node ("pending data"), at an input port of the switch, for transfer to an output port of the switch. The pending data can comprise, for example, a data packet. In operation 412 a DEoS arbiter can detect the pending data based on input data received in a buffer of the switch, or of a switch port (e.g., a FIFO buffer receiving input data packets). A switch can include, for example, a status associated with a data buffer, and/or associated with an input port, receiving input data. A DEoS arbiter can poll such status, and/or the status can cause an interrupt or logic signal to the arbiter, for the arbiter to detect pending data.

In operation 414 the arbiter decodes an identity (e.g., a port name or number) of the input port that received the data and, in operation 416, the arbiter decodes an identity of the source node (e.g., a node name, a node number, or a topological address of the node within the switching network) having input the pending data. Using the preceding example of a FIFO buffer of a switch storing input data packet, in operation 416 the arbiter can, for example, decode from the input data packet and/or the FIFO, the identity of the source port on which the packet arrived and/or the source node that input the data packet. In operation 418, the arbiter retrieves a DEoS counter (as an example node DEoS metric) associated with the source node decoded in operation 416 and, in operation 420, the arbiter updates the counter.

As previously described, a DEoS counter can be a count-up counter and, in operation 420, updating the counter can comprise the arbiter incrementing (e.g., from an initial, minimum value) the DEoS counter for the source node determined in operation 416. Alternatively, the DEoS counter can be a count-down counter and, in operation 420, updating the counter can comprise the arbiter decrementing (e.g., from an initial maximum value) the DEoS counter for the source node determined in operation 416. In implementations, a DEoS counter can be a count, for example, of packets received, over a period of time, at a particular input port from a particular source node and, in operation 420, the arbiter can increment (or, alternatively, decrement) the DEoS counter associated with the source node to correspond to that number of input data packets received from the active node at that input port over some period of time. The DEoS counter can (alternatively, or additionally) be a count of an amount of data received (e.g., a number of bytes in an input data packet), over an amount of time, at a particular input port from a particular source node. In operation 420, the arbiter can increment (or, alternatively, decrement) the DEoS counter associated with the source node to correspond to that amount of input data received from that node at that input port.

Updating the DEoS counter, in operation 420, to correspond to data received from the decoded source node can thereby provide the arbiter with a historical indication of dynamic data input (to the switch) behavior of the source node over time, relative to other source nodes at the same or other input ports of the switch. An aggregate (e.g., a sum) of DEoS counters for all source nodes inputting data to the same input port provides the arbiter with a historical indication of dynamic data input behavior of all source nodes inputting data to the same input port over time, relative to other input ports of the switch (i.e., relative to a similar aggregate of counters of source nodes inputting data to those other input ports).

In operation 422, the arbiter determines if the updated DEoS counter has reached a wrap value (e.g., a maximum value for a count-up counter, or a minimum value for a count-down counter). If, in operation 422, the arbiter determines that the updated DEoS counter has reached a wrap value, in operation 424 the arbiter adjusts DEoS counters associated with all source nodes that send input data to the input port decoded in operation 414. Adjusting the DEoS counters can enable the DEoS arbiter to continue to count (that is, not remain at the maximum or minimum value) data input by a source node that reaches the wrap value. In one implementation, in operation 424 the arbiter can adjust the counters by, for example, resetting (to a maximum or minimum value) all counters associated with source nodes inputting data to a particular input port.

However, an effect of resetting all of the counters is that the arbiter can lose the previous data input behavior of the source nodes inputting to that particular input port. In an improved, alternative implementation, as a result of one source node's DEoS counter reaching a wrap value, in operation 424 the arbiter can adjust the DEoS counters for the source nodes inputting data to the port decoded in operation 414. For example, in operation 414 the arbiter can divide each of the DEoS counters for source nodes inputting data to the port decoded in operation 414 by an integer divisor. For example, in operation 424, the arbiter can divide by 2, or 4, the DEoS counters for all of the source nodes inputting data to the port decoded in operation 414. This enables the DEoS arbiter to continue to count data input by a source node reaching the wrap value while preserving relative proportions of data input into the input port by all source nodes that input data into that port. Additionally, as one or more source nodes continue to input data into an input port and reach a wrap value, and the arbiter adjusts all counters for all source nodes inputting data into that input port, over time other source nodes, having lower data input activity into that input port, "age out" of the contribution to the aggregate data input to, and corresponding switch service requirements of, that input port.

In operation 426 the arbiter updates the QRs corresponding to each of the adjusted DEoS counter values. If, in operation 422, the arbiter determines that the updated DEoS counter has not wrapped, in operation 426 the arbiter updates the QR corresponding to the updated DEoS counter value. The arbiter can repeat operation 412 to detect additional data pending and, based on any additional pending data detected, can repeat operations 414-426.

To illustrate the results of operations of method 410, in FIG. 4B Table 400A illustrates example states of DEoS counters and QR values for input ports of switch 202C, and source nodes A-H and SWN 208 of FIG. 2, at a particular point in time. Table 400B, in FIG. 4B, then illustrates example DEoS counter and QR values at some later time, following some number of DEoS counter and/or QR updates associated with source node activity and/or arbitration cycles of switch 202C.

In Table 400A, source nodes A, B, E, and F, for example, are shown to share switch 202C port 0 as an input port to send data through switch 202C. Table 400A illustrates example DEoS counter values, and possible corresponding QR values, for each of source nodes A through H. Suppose that a DEoS arbiter performs method 410 to arbitrate among switch 202C input ports 0, 1, and 3 to make a through-connection to an output port of switch 202C (e.g., port 2). In operations 412-416, suppose the arbiter detects data pending (e.g., a data packet received by the switch) and decodes the pending data having been received on port 0 from source node B. In operation 418 the arbiter retrieves a DEoS counter associated with node B and, in operation 420 the arbiter increments the DEoS counter.

Table 400B illustrates an example result of the DEoS arbiter updates, just described, to Table 400A DEoS counter and QR values. In table 400B, the updated values highlighted are shown with a gray background for ease of correlating updated DEoS metric entries between Tables 400A and 400B. Using the example Table 400A DEoS counter value for node B, 15, incrementing the node B DEoS counter would cause the node B DEoS counter to wrap. Based on the node B DEoS counter reaching the wrap value, the arbiter performs operation 424 to adjust (e.g., divide by 2) the DEoS counters of all 4 source nodes—A, B, E, and F—that have input data to port 0. In operation 426 the arbiter then updates the QR values to correspond to each of the updated DEoS counters. Table 400B illustrates the results the DEoS arbiter adjusting (based on detecting data input by node B) the DEoS counters for all of nodes A, B, E, and F, and recomputing QR values that can correspond to the updated node A, B, E, and F DEoS counters, such that table 400B counter and QR values reflect the dynamic data input activity of source nodes into port 0.

While node DEoS metrics, such as a DEoS counter and/or DEoS QR, can be indicative of dynamic data input activity of a source node into a switch input port, as previously described, a port DEoS metric can correspond to, or be indicative of, aggregate (combined) data input activity of multiple, or all, source nodes into a particular input port. For example, a higher value of a port DEoS weight (or an alternative port DEoS metric) of an input port of a switch can indicate higher aggregate data input activity among source nodes inputting to that input port compared to aggregate data input activity among source nodes inputting data to another input port of the switch. Similarly, a lower value of a port DEoS weight (or an alternative DEoS metric), for one input port, can indicate lower aggregate data input activity among source nodes inputting to that input port compared to aggregate data input activity among source nodes inputting data to another input port.

A DEoS arbiter can compute a port DEoS weight for each of the input ports of a switch and can select an input port (e.g., during an arbitration cycle) to make a through-connection to an output port of the switch based on the comparative port DEoS weights of the input ports. A DEoS arbiter can compute a port DEoS weight for each input port of a switch based on DEoS counter and/or QR values associated with source nodes inputting data to those ports. The arbiter can compute a port DEoS weight for an input port comprising, for example, a sum of all source node DEoS counters, and/or a sum of all QRs of all source nodes, inputting data to the input port.

In implementations, a DEoS arbiter can limit, or "cap", a computed DEoS metric value, such as capping a value of a sum of DEoS counters and/or sum of QR values, to a value less than a maximum possible value of that metric. For example, as previously described using a 2-bit QR for each source node of a particular switch input port of a switch, and potentially 64 source nodes capable of inputting data to that port, summing all QR values associated with that input port requires an 8-bit adder/accumulator. However, the DEoS arbiter capping the computed port DEoS weight at a value less than the absolute maximum (e.g., 15, 31, or 63 versus 127) can further reduce the number of adder/accumulator bits and, can simplify the adder/accumulator circuitry (in this, case requiring then only a corresponding 4, 5, or 6-bit adder/accumulator). Capping a computed port DEoS weight in this way can have an additional effect of preventing highly active source nodes of an input port from starving lower-level source nodes in cases of extreme activity by those higher activity source nodes.

Arbitrating, among the switch input ports, can comprise the DEoS arbiter selecting, based on port DEoS metrics, a next input port to make a through-connection as part of an arbitration cycle. Selecting the next input port can comprise the DEoS arbiter configuring the switch, during an arbitration cycle, to make the through-connection. Alternatively, arbitrating among switch input ports can comprise the DEoS arbiter selecting a next input port to make a through-connection and updating an RRP to indicate the selected input port. The DEoS arbiter can, in an arbitration cycle, select an input port to make the through-connection based on the RRP.

FIG. 4C illustrates example method 430 to arbitrate among input ports of a switch based on DEoS metrics, such as DEoS counters, QRs, and/or port DEoS weights. A DEoS arbiter can perform a method similar or equivalent to method 430 to select input ports of a switch to make a through-connection to an output port of the switch. For purposes only of illustrating the method, but not intended to limit implementations, the method is described with continuing reference to the example of switch 202C and SWN 200, used to illustrate method 410 and, as performed by a DEoS arbiter of switch 202C using a DEoS metric. Thus, in the description of method 430, "the switch" refers to switch 202C in FIG. 4A; "the arbiter" refers to a DEoS arbiter of switch 202C, such as previously described with reference to a DEoS arbiter performing method 410 of FIG. 4A; and "the DEoS metric" can be considered to be a port DEoS weight. As previously described, the dynamic port DEoS weights can comprise a sum of DEoS counters, or a sum of QR values, associated with sources nodes that can input to an input port of a switch.

However, it would be apparent to one of ordinary skill in the art that a switch can be other than a switch as illustrated by the example of switch 202C; that a DEoS arbiter that can be an arbiter of other switches, in addition to switch 202C; that a DEoS metric can be other than a port DEoS weight; and/or, that a dynamic port DEoS weight can comprise other than a sum of DEoS counters and/or sum of DEoS QR values.

Turning to FIG. 4C, in operation 432 of example method 430, the arbiter, optionally, initializes a DEoS RRP. A DEoS arbiter can, optionally, use a DEoS RRP to indicate a next input port to make a through-connection. Thus, in operation 432 the arbiter can initialize a DEoS RRP to indicate an initial (or, first) input port of switch 202C to make a through-connection. The initial port indicated in the RRP can be determined based on, for example, a topology of the switch or switch network, and/or particular nodes coupled to the switch (e.g., types of nodes, or prior activity of particular nodes as data sources to the switch). The arbiter can perform operation 432 as part of configuring a switch network (e.g., to perform processing operations of a particular specialized application) and/or (for example) loading an RDS configuration into a set of CUs, and/or as part of an overall initialization process of an RDS.

In operation 434 the arbiter initiates an arbitration cycle to select an input port to make a through-connection through the switch. In operation 436, the arbiter retrieves DEoS metrics associated with input ports of the switch. Optionally, or alternatively, in operation 436, the arbiter can retrieve an RRP associated with the switch. In operation 438, the arbiter selects an input port (i.e., arbitrates among the input ports) to make a through-connection based on the DEoS metrics or, alternatively, the RRP.

In operation 438, the arbiter can select the input port based on the DEoS metrics retrieved in operation 436. For example, in operation 438, for each of the input ports of the switch, the arbiter can retrieve source node DEoS counters and can compute a respective port DEoS weight (e.g., a sum of all node DEoS counters inputting data into that respective port). In operation 438, for each of the input ports of the switch, the arbiter can retrieve (and/or, can dynamically compute) QRs associated with source node DEoS counters for all source nodes inputting data into that port. Additionally, or alternatively, in operation 438 the arbiter can compute a respective port DEoS weight based on the QR values (e.g., a sum of QR values for all source nodes inputting data into that respective port). Based on a comparison of the port DEoS weights, the arbiter, in operation 438, can select an input port to make a through-connection to an output port of the switch. For example, in operation 438 the arbiter can select an input port having a highest, or higher, DEoS weight sum compared to other input ports or, alternatively (e.g., based on count down DEoS counters) the arbiter can select an input port having a lowest, or lower, DEoS weight compared to other input ports. In another example, in operation 438, the arbiter can select the input port based on a value of an RRP (e.g., based on the RRP indicating a particular input port).

In operation 440, the arbiter establishes a through-connection of the input port selected in operation 438 to a destination output port of the switch. In operation 440, the arbiter can, for example, configure the switch (e.g., connect the input port to the output port, and/or set source/destination port routing tables of the switch) to establish the through-connection.

In operation 442, based on the DEoS metrics (and/or port DEoS weights) the arbiter can, optionally, update a DEoS RRP. In operation 442, the arbiter can update a DEoS RRP to indicate an input port to select for a through-connection of the switch on a current or, alternatively, a subsequent arbitration cycle. The DEoS arbiter can update the RRP to indicate, for example, an input port having a higher (or, alternatively, a lower) port DEoS weight, in comparison to other input ports of the switch. In another example, the DEoS arbiter can, in operation 442, compare source node DEoS counters and/or QR values of input ports of the switch and can modify the RRP to indicate an input port having a highest (or, alternatively, lowest) DEoS counter/QR value compared to DEoS counter/QR values of source nodes of other input ports.

In implementations, a DEoS arbiter can perform operation 442 in conjunction with operations of a method to determine DEoS counter and/or QR values associated with source nodes of a switch, such as method 410 in FIG. 4B. For example, in operation 436, the arbiter can retrieve results of operations of method 410 (e.g., updated DEoS counters, QRs, and/or port DEoS weights). The arbiter can use the method 410 results, retrieved in operation 436, to select, in operation 438, an input port and/or, in operation 442, to update an RRP.

In implementations a DEoS arbiter can perform operations of method 410 as part of, or in conjunction with, an arbitration cycle, such as an arbitration cycle comprising one or more of operations 434-442 of method 430. Additionally, or alternatively, a DEoS arbiter can perform operations of method 410 independent of an arbitration cycle. For example, in parallel with data transfer through a switch, via an active through-connection, a DEoS arbiter can perform operations such as selecting an input port, determining source nodes having data pending at an input port, updating associated node and/or DEoS metrics (e.g., DEoS counter, QRs, and/or port DEoS weights), and/or updating an RRP (such as in operation 442 of method 430). A DEoS arbiter can perform these operations with regard to multiple ports of a switch, concurrently or serially.

Figure 5:
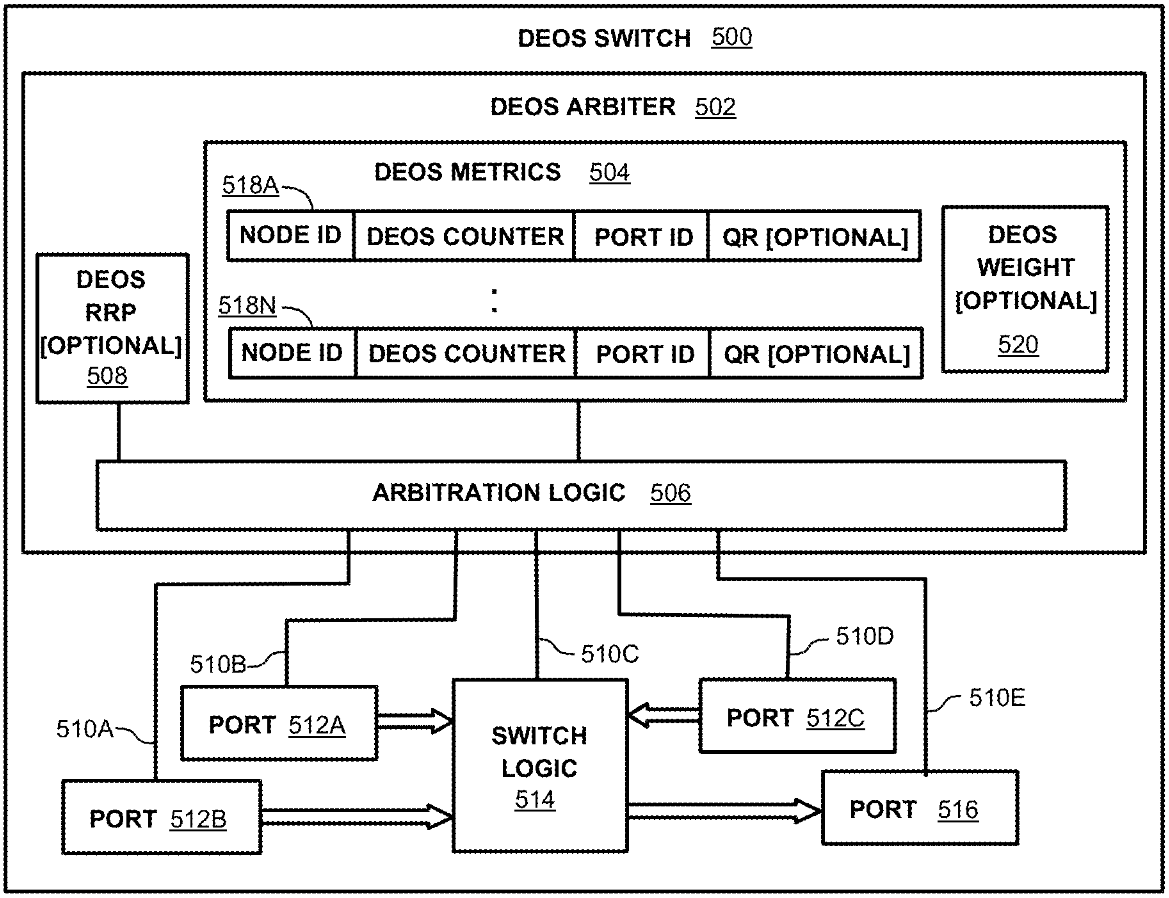
FIG. 5 illustrates an example DEoS arbiter, according to aspects of the disclosure.

FIG. 5 illustrates example DEoS switch 500 (hereinafter, "switch 500") comprising DEoS arbiter 502, ports 512A, 512B, and 512C (collectively, "ports 512") configured to operate as input ports of switch, port 516 configured to operate as an output port of switch 500, and switch logic 514. In implementations switch 500 can be a switch of a switch network similar or equivalent to switch networks SWN 100 of FIG. 1A, SWN 126A and SWN 126B of FIG. 1C, and SWN 200 of FIG. 2. Switch 500 can be a switch of a switching fabric such as SWF 120 of FIG. 1C.

As illustrated in FIG. 5, ports 512A, 512B, and/or 512C can operate, for example, as input ports to receive input data from source nodes (not shown in FIG. 5) connected to switch 550 (and/or to a switch network including switch 500). Arbitration logic 506 can configure switch logic 514 to make a through-connection from ports 512A, 512B, and/or 512C to port 516D, to transfer data input to ports 512A, 512B, and/or 512C to port 516D for output from switch 500. However, ports 512A, 512B, and/or 512C configured as input ports, and port 516 configured as an output port, of switch 500 are for purposes only of illustrating the example of FIG. 5, and not intended to limit implementations. It would be apparent to one of ordinary skill in the art that any set of ports of a switch (e.g., any of ports 512 and/or 516 in FIG. 5) can be configured as input and/or output ports of a switch such as switch 500.

While not shown in FIG. 5, ports among ports 512 and 516 can comprise a processor and/or memory, specialized circuits, data and/or status interfaces, and/or various combinations of these, to receive input data, establish through-connections, output data transferred through the switch (e.g., via a through-connection). Ports among port 512 can comprise status indicators to indicate input data pending for transfer at ports 512. A memory of ports among ports 512 and/or port 516 can include buffers to store input and/or output data. The buffers can be organized as, or form, a FIFO of input data.

Switch logic 514 can comprise a processor and/or memory, specialized circuits, data and/or status interfaces, and/or various combinations of these, to configure and/or make through-connections from an input port among ports 512 to port 516 and/or to transfer data from ports 512 to port 516. For example, switch logic 514 can comprise configuration and/or port routing tables, and/or switching logic circuits, to transfer data from ports 512 to port 516. Switch logic 514 can comprise a packet switch and switch logic 514 can comprise logic to transfer input data packets from an input port among ports 512 to output port 516.

FIG. 5 depicts DEoS arbiter 502 comprising optional DEoS RRP 508, DEoS metrics 504 ("metrics 504"), and arbitration logic 506. Optional DEoS RRP 508 can comprise a DEoS RRP such as previously described and DEoS arbiter 502.

As shown in FIG. 5, metrics 504 can comprise node DEoS metrics 518A-518N (collectively, "metrics 518") for a respective source node among "N" source nodes that can input data into ports among ports 512 of switch 500. For example, "N" be 16 for 16 source nodes that can input data to ports among ports 512. As further shown in FIG. 5, each of node metrics 518 can comprise an identity (node ID) of a source node, a DEoS counter associated with the source node, an identity (port ID) of an input port among ports 512 on which the source node can input data to switch 500, and, optionally, a DEoS QR corresponding to the source node DEoS counter. Alternative to storing a QR value, in performing a method such as method 410 and/or 430 of FIGS. 4A and 4C, DEoS arbiter 502 can dynamically compute a QR value, such as when updating DEoS counters among metric 518.

FIG. 5 further depicts metrics 504 comprising optional DEoS weight 520. In implementations, DEoS arbiter 502 can compute a DEoS weight as, for example, a sum of DEoS counters among metrics 518, or as a sum of QR values associated with DEoS counters among metrics 518. DEoS arbiter 502 can compute such a sum, for example, in conjunction with, or as a result of, updating DEoS counters among metrics 504 and can, optionally, store the DEoS weight as DEoS weight 520. Alternatively, DEoS arbiter 502 can dynamically compute a DEoS weight as part of arbitrating (e.g., using a method similar or equivalent to method 430 of FIG. 4C) among ports 512.

Arbitration logic 506 can comprise logic circuits (and/or processors) to perform operations of methods such as example methods 410 and 430 of FIGS. 4A and 4C. Using arbitration logic 506, DEoS arbiter 502 can, for example, compute metrics among metrics 504 and/or to compute optional DEoS RRP 508. Using arbitration logic 506, DEoS arbiter 502 can compute port DEoS metrics such as a port DEoS weight, can select an input port among ports 512 to make a through-connection, and/or can configure switch logic 514 to make a through connection of ports among ports 512 to port 516.

To arbitrate among ports 512, and/or configure switch 500 to make through-connections, DEoS arbiter 502 can performs methods, or operations of methods, similar or equivalent to methods 410 and/or 430 and operations thereof. DEoS arbiter 502 can use, for example, optional DEoS RRP 508, and/or DEoS metrics among metrics 504, to arbitrate among ports 512A, 512B, and/or 512C to make through-connections to port 516. As previously described, DEoS arbiter 502 can comprise a processor, a memory, specialized switch arbitration circuits, and/or firmware or software programs. Firmware and/or software programs of DEoS arbiter 502 can execute, for example, on processors of a switch, specialized circuits of a switch, and/or a processor of an RDU. References herein to DEoS arbiter 502 implicitly include Arbitration logic 506 as a component of DEoS arbiter 502 capable of performing operations of DEoS arbiter 502.

FIG. 5 further illustrates Arbitration logic 506 coupled to ports 512A, 512B, 512C, and 516 by interfaces 510A, 510B, 510C, 510D, and 510E (collectively, "interfaces 510"). In implementations, interfaces among interfaces 510 can be interfaces DEoS arbiter 502 can utilize to perform operations of methods similar or equivalent to methods 410 and/or 430. For example, DEoS arbiter 502 can utilize interfaces among interfaces 510 to determine input data is pending at ports among ports 512; to determine source nodes associated with input data pending at ports among ports 512; to configure ports among ports 512; to configure switch logic 514; and/or to configure port 516. Interfaces among interfaces 510 can be any type of electronic (e.g., wires) and/or data interface (e.g., a data bus or I/O link, and/or data in registers and/or memories) suitable for DEoS arbiter 502 to arbitrate and/or configure ports and/or switching logic of switch 500.

While FIG. 5 illustrates DEoS port metrics as components of DEoS arbiter 502, this is only to illustrate the disclosure. In implementations, DEoS port metrics, such as metrics 504, can be metrics stored in a memory of a DEoS switch, or a memory of ports of a DEoS switch. DEoS port metrics can be included in specialized registers, or specialized circuits, of a DEoS switch, or of a component of a computing system utilizing a DEoS switch. DEoS port metrics, such as metrics 504, can be included in components of a switch network, and/or switch fabric, not shown in FIG. 5, such as included in nodes of an RDS coupled to switch 500 or nodes coupled to a switch network including switch 500.

For purposes of illustrating the disclosure, FIG. 5 illustrates switch 500 comprising 4 ports (with ports 512 configured as input ports and port 516 configured as an output port to make through-connections and output data received from ports 512). However, this is not intended to limit implementations and it would be apparent to one of ordinary skill in the art that, in implementations, a switch similar or equivalent to switch 500 can comprise fewer or, alternatively, more than 4 ports and the ports can operate as both input and output ports. Further, in implementations a DEoS arbiter, such as DEoS arbiter 502, need not necessarily be included, in whole or in part, in a switch. In alternative implementations, a DEoS arbiter can be included partially within a switch or can be an arbiter (e.g., a specialized circuit, a processor, or combination of these) operatively coupled to a switch and/or ports of a switch.

Figure 6:
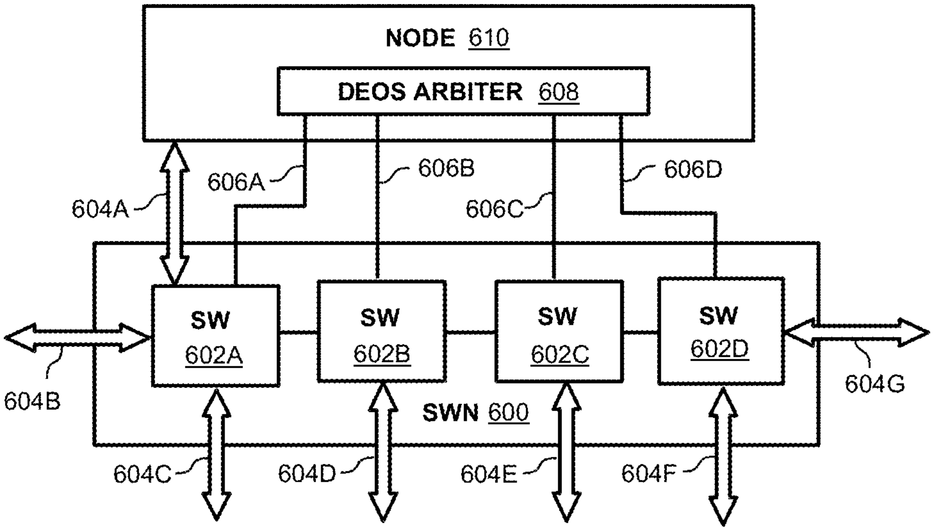
FIG. 6 illustrates an example DEoS arbiter included in a node of a switch network, according to aspects of the disclosure.

Additionally, while FIG. 5 illustrates DEoS arbiter 502 as included in switch 500, this is only for purposes of illustrating the disclosure and not intended to limit implementations. In alternative implementations, a DEoS arbiter, such as DEoS arbiter 502, can be included in components of a computing system (e.g., nodes of an RDS) other than a switch. FIG. 6 illustrates an alternative example DEoS arbiter coupled to switches of a switch network. In FIG. 6, SWN 600 is shown comprising switches SW 602A. SW 602B, SW 602C, and SW 602D (collectively, "switches 602") and DEoS arbiter 608 is shown included in node 610, Node 610 is shown coupled to switch network SWN 600 via interfaces 606A, 606B, 606C, and 606D (collectively, "interfaces 606").

In implementations, switches 602 can be switches and, SWN 600 can be a switch network, such as described in the foregoing examples of the disclosure. Interfaces 604A 604B, 604C, 604D, 604E, 604F, and 604G, coupled to respective switches among switches 602, can be interfaces to input data to and/or output data from switches, among switches 602, and/or SWN 600. Node 610 can be a node of a switch network such as described in the foregoing examples of the disclosure. Via interfaces among interfaces 606 node 610 to be a source node to input data into SWN 600 (via interface 606A to SW 602A) and/or be a destination node to receive data from other nodes (not shown in FIG. 6) coupled to SWN 600.

Except for inclusion in node 610, DEoS arbiter can be a DEoS arbiter such as described in the foregoing examples of the disclosure. Interfaces 606 can be interfaces similar or equivalent to interfaces 510 of FIG. 5, and DEoS arbiter 608 can utilize interfaces 606, for example, to perform methods, or operations of methods, such as methods 410 and/or 430, to arbitrate among input ports of switches 602.

In another alternative implementation, switches among switches 602 can be, instead of individual switches, switch networks. SWN 600 can be, then, a switch fabric comprising switch networks. Node 610 can be a node coupled to a switch of a switch network included in the switching fabric. Interfaces 606 can include interfaces to perform switch port arbitration among ports of switches of the switching fabric.

The flowchart and block diagrams in the drawings illustrate the architecture, functionality, and operation of possible implementations of systems, methods, and computer program products according to various implementations of the disclosure. Individual elements illustrated in the drawings—such as individual operations illustrated in the flowcharts or individual blocks of block diagrams—may represent a module, segment, or portion of executable instructions for implementing the disclosed function(s).

In various alternative implementations, particular operations may occur in an order differing from that illustrated in the examples of the drawings. For example, two operations shown in succession in a diagram of the disclosure may, in a particular implementation, be executed substantially concurrently, or may sometimes be executed in a reverse order, depending upon the functionality involved. It will be further noted that particular blocks of the block diagrams, operations of the flowchart illustrations, and/or combinations of blocks in the block diagrams and/or flowchart illustrations, can be implemented using special purpose hardware and/or systems that, individually or in combination, perform the specified functions, acts, and/or computer instructions.

Terminology used herein, and the examples disclosed, are chosen to illustrate the principles of the implementations, the practical application or technical improvement over alternative technologies, and to enable others of ordinary skill in the art to understand the implementations disclosed herein. The disclosure illustrates various example implementations, and the examples are intended to illustrate principles and aspects of the disclosure, but are not intended to limit implementations, nor intended to be exhaustive of implementations that may be conceived within the scope of the disclosure. It would be apparent to one of ordinary skill in the art that alternative implementations can comprise modifications and combinations within the spirit of the disclosure and the scope of the claims.

As can be seen in the foregoing examples, features of the disclosure can comprise methods and apparatus of computing systems. A summary of example implementations of such features includes:

Example Implementation 1

A method of arbitrating switch ports comprises a Dynamic Equality of Service (DEoS) arbiter of a switch, responsive to dynamic data input activity of a first set of source nodes inputting data into a first input port of a switch computing a first value of a port DEoS metric, the first set of source nodes among a plurality of nodes of a computing system communicatively coupled to the switch, the first value of the port DEoS metric corresponding to an aggregate of the dynamic data input activity of the first set of source nodes into a first input port.

The method further comprises the DEoS arbiter computing, responsive to dynamic data input activity of a second set of nodes inputting data into a second input port of the switch, a second value of the port DEoS metric, the second set of source nodes among the plurality of nodes, the second value of the port DEoS metric corresponding to an aggregate of the dynamic data input activity of the second set of source nodes into the second input port. On the method, in conjunction with an arbitration cycle of the switch and based on the first and second values of the port DEoS metric, the DEoS arbiter selects the first input port of the switch to make a through-connection to an output port of the switch.

Example Implementation 2

In the method of example implementation 1, the DEoS arbiter is included in the switch.

Example Implementation 3

In the method of example implementation 1, based on the selecting the first input port to make the through-connection, the DEoS arbiter sets a round robin pointer to indicate the first input port selected to make the through-connection.

Example Implementation 4

In the method of example implementation 1, wherein the dynamic data input activity of the first set of source nodes into the first input port comprises first data input to the first input port by a first source node among the first set of source nodes; wherein the method further comprises detecting, by the DEoS arbiter, the first data input and, responsive to the detecting the first data input, computing, by the DEoS arbiter, a value of a first DEoS counter, the first DEoS counter associated with the first source node; and, wherein the method of the DEoS arbiter computing the first value of the port DEoS metric comprises the DEoS arbiter computing the first value of the port DEoS metric based, at least in part, on the value of the first DEoS counter.

Example Implementation 5

In the method of example implementation 4, wherein the value of the first DEoS counter corresponds to a number of data packets input, over a period of time, by the first source node into the first input port.

Example Implementation 6

In the method of example implementation 4, wherein the value of the first DEoS counter corresponds to an amount of data input, over a period of time, by the first source node into the first input port.

Example Implementation 7

In the method of example implementation 4, wherein the dynamic data input activity of the first set of source nodes into the first input port further comprises second data input to the first input port by a second source node among the first set of source nodes; wherein the method further comprises detecting, by the DEoS arbiter, the second data input and, responsive to the detecting the second data input, computing, by the DEoS arbiter, a value of a second DEoS counter, the second DEoS counter associated with the second source node; and, wherein the method of the DEoS arbiter computing the first value of the port DEoS metric based on the first DEoS counter comprises the DEoS arbiter computing the first value of the port DEoS metric as a sum of the value of the first DEoS counter and the value of the second DEoS counter.

Example Implementation 8

In the method of example implementation 7, the method further comprises determining, by the DEoS arbiter, that the value of the first DEoS counter corresponds to a wrap value of the first DEoS counter; and responsive to the determining that the value of the first DEoS counter corresponds to the wrap value, computing, by the DEoS arbiter, an adjusted count value of the first DEoS counter and an adjusted count value the second DEoS counter.

Example Implementation 9

In the method of example implementation 8, wherein the DEoS arbiter computing the adjusted count value of the first DEoS counter and the adjusted count value of the second DEoS counter comprises the DEoS arbiter dividing each of the first DEoS counter and the second DEoS counter by an integer.

Example Implementation 10

In the method of example implementation 7, the method further comprises computing, by the DEoS arbiter, a value of a first quantization range and a value of a second quantization range, the first quantization range corresponding to a first range of counter values including the first value of the first DEoS counter, the second quantization range corresponding to a second range of counter values including the value of the second DEoS counter; and wherein the method of the DEoS arbiter computing the first value of the port DEoS metric based on the value of the first DEoS counter and the value of the second value of the DEoS metric comprises the DEoS arbiter computing the first value of the port DEoS metric based on the value of the first quantization range and the value of the second quantization range.

Example Implementation 11

In the method of example implementation 10, wherein the method of the DEoS arbiter computing the first value of the port DEoS metric based on the value of the first quantization range and the value of the second quantization range further comprises the DEoS arbiter computing the first value of the port DEoS metric as a sum of the value of the first quantization range and the value of the second quantization range.

Example Implementation 12

In the method of example implementation 11, wherein the sum of the value of the first quantization range and value of the second quantization range has a maximum value; and, wherein the method of the DEoS arbiter computing the sum of the value of the first quantization range and the value of the second quantization range further comprises the DEoS arbiter limiting the sum of the value of the first quantization range and the value of the second quantization range to a value less than the maximum value.

Example Implementation 13

A switching apparatus of a computing system comprises a switch having a plurality of input ports and an output port, a plurality of nodes of the computing system communicatively coupled to the switch, and a Dynamic Equality of Service (DEoS) arbiter. In the switching apparatus, the DEoS arbiter is configured to compute, responsive to dynamic data input activity of a first set of source nodes, among the plurality of nodes, inputting data into a first input port of a switch, a first value of a port DEoS metric, the first value of the port DEoS metric corresponding to an aggregate of the dynamic data input activity of the first set of source nodes into a first input port; compute, responsive to dynamic data input activity of a second set of source nodes, among the plurality of node, inputting data into a second input port of a switch, a second value of the port DEoS metric, the second value of the port DEoS metric corresponding to an aggregate of the dynamic data input activity of the second set of source nodes into the second input port; and select, in conjunction with an arbitration cycle of the switch, based on the first and second values of the port DEoS metric, the first input port to make a through-connection to the output port.

Example Implementation 14

In the switching apparatus of example implementation 13, the switching apparatus further comprises a round robin pointer and the DEoS arbiter is further configured to set, based on the selecting the first input port to make the through-connection, the round robin pointer to indicate the first input port selected to make the through-connection.

Example Implementation 15

In the switching apparatus of example implementation 13, wherein the switching apparatus further comprises a first DEoS counter, the first DEoS counter associated with a first source node among the first set of source nodes; wherein the dynamic data input activity of the first set of source nodes into the first input port comprises a first data input to the first input port by the first source node; wherein the DEoS arbiter is further configured to detect the first data input and, responsive to the detecting the first data input, to compute a value of the first DEoS counter; and, wherein the DEoS arbiter configured to compute the first value of the port DEoS metric responsive to the dynamic data input activity of the first set of source nodes comprises the DEoS arbiter further configured to compute the first value of the port DEoS metric based, at least in part, on the value of the first DEoS counter.

Example Implementation 16

In the switching apparatus of example implementation 15, wherein the value of the first DEoS counter corresponds to a number of data packets input, over a period of time, by the first source node into the first input port.

Example Implementation 17

In the switching apparatus of example implementation 15, wherein the value of the first DEoS counter corresponds to an amount of data input, over a period of time, by the first source node into the first input port.

Example Implementation 18

In the switching apparatus of example implementation 15, wherein the dynamic data input activity of the first set of source nodes into the first input port further comprises second data input to the first input port by a second source node among the first set of source nodes; wherein the switching apparatus further comprises a second DEoS counter, the second DEoS counter associated with the second source node; wherein the DEoS arbiter is further configured to detect the second data input and, responsive to the detecting the second data input, compute a value of a second DEoS counter; and, wherein the DEoS arbiter configured to compute the first value of the port DEoS metric comprises the DEoS arbiter further configured to compute the first value of the port DEoS metric as a sum of the value of the first DEoS counter and the value of the second DEoS counter.

Example Implementation 19

In the switching apparatus of example implementation 18, the DEoS arbiter is further configured to determine that the first value of the first DEoS counter corresponds to a wrap value of the first DEoS counter and, responsive to the determining that the first value of the first DEoS counter corresponds to the wrap value of the first DEoS counter, compute adjusted count values of the first and second DEoS counters.

Example Implementation 20

In the switching apparatus of example implementation 19, wherein the DEoS arbiter configured to compute the adjusted count value of the first DEoS counter and the adjusted count value of the second DEoS counter comprises the DEoS arbiter further configured to divide each of the value of the first DEoS counter and the value of the second DEoS counter by an integer.

Example Implementation 21

In the switching apparatus of example implementation 18, wherein the DEoS arbiter is further configured to compute a value of a first quantization range and a value of a second quantization range, the value of the first quantization range corresponding to a range of counter values including the value of the first DEoS counter, the value of the second quantization range corresponding to a range of counter values including the value of the second DEoS counter; and, wherein the DEoS arbiter configured to compute the first value of the port DEoS metric based on the value of the first DEoS counter and the value of the second DEoS counter comprises the DEoS arbiter further configured to compute the first value of the port DEoS metric based on the value of the first quantization range and the value of the second quantization range.

Example Implementation 22

In the switching apparatus of example implementation 21, wherein the DEoS arbiter configured to compute the first value of the port DEoS metric based on the value of the first quantization range and the value of the second quantization range comprises the DEoS arbiter further configured to compute the first value of the port DEoS metric as a sum of the value of the first quantization range and the value of the second quantization range.

Example Implementation 23

In the switching apparatus of example implementation 22, wherein the sum of the value of the first quantization range and the value of the second quantization range has a maximum value; and wherein the DEoS arbiter configured to compute the sum of the value of the first quantization range and the value of the second quantization range comprises the DEoS arbiter further configured to limit the sum of the value of the first quantization range and the value of the second quantization range to a value less than the maximum value.

The invention claimed is:

1. A switching apparatus of a computing system, the switching apparatus comprising:

a switch, the switch comprising a plurality of input ports and an output port; and a Dynamic Equality of Service (DEoS) arbiter, wherein the DEOS arbiter is configured to: arbitrate among input ports of the switch to allocate through-connections to the input ports in response to dynamic activity or rate or amount of data input into the switch by source nodes connected to the switching apparatus; and wherein the arbitration for establishing a through-connection is based on node DEOS port metrics; and wherein the node DEOS port metrics are based on DEOS counters and/or quantization ranges of DEOS counters associated with the source nodes.

2. The switching apparatus of claim 1, wherein the DEOS arbiter is configured to arbitrate among ports of a plurality of switches for a reconfigurable dataflow system having a reconfigurable host processor and an array of computing units.

3. The switching apparatus of claim 1, wherein the DEOS arbiter comprises a processor, a memory, specialized switch arbitration circuits, and/or firmware or software programs for executing operations for arbitrating among ports of one or more switches included in the switching apparatus to allocate through-connections among ports of a plurality of switches included in a reconfigurable dataflow system (RDS).

4. The switching apparatus of claim 1, responsive to dynamic data input activity of a first set of source nodes, among the source nodes, wherein the DEOS arbiter is configured to:

input data into a first input port of the switch, based on a first value of a port DEOS metric, the first value of the port DEOS metric corresponding to an aggregate of the dynamic data input activity of the first set of source nodes into the first input port;

compute, responsive to dynamic data input activity of a second set of source nodes, among the source nodes, inputting data into a second input port of the switch, a second value of the port DEOS metric, the second value of the port DEOS metric corresponding to an aggregate of the dynamic data input activity of the second set of source nodes into the second input port; and select, in conjunction with an arbitration cycle of the switch, based on the first value of the port DEOS metric and the second value of the port DEOS metric, the first input port to make a through-connection to the output port.

5. The switching apparatus of claim 4, wherein the switching apparatus further comprises a round robin pointer (RRP); and wherein the DEOS arbiter is further configured to set, based on the selecting the first input port to make the through-connection, the round robin pointer to indicate the first input port selected to make the through-connection.

6. The switching apparatus of claim 5, wherein the DEOS arbiter uses the round robin pointer (RRP) to indicate a particular input port currently using, last using, or next to use a through-connection to the output port; and wherein the DEOS arbiter selects the input port indicated by the RRP and makes a through-connection from the input port to the output port at a start of a next arbitration cycle.

7. The switching apparatus of claim 5, wherein the DEOS arbiter uses a weighted round robin (WRR) method of arbitration, wherein the DEOS arbiter applies a respective weight to each of the input ports of the switch and grants through-connections to the input ports based on relative weights of the input ports.

8. The switching apparatus of claim 7, wherein the through-connection to a particular input port for a number of arbitration cycles is based on a weight associated with a source node connected to the particular input port of the switch.

9. The switching apparatus of claim 1, wherein the switching apparatus further comprises a first DEOS counter, the first DEOS counter associated with a first source node among the first set of source nodes;

wherein the dynamic data input activity of the first set of source nodes into the first input port comprises a first data input to the first input port by the first source node;

wherein the DEOS arbiter is configured to detect the first data input and, responsive to the detecting the first data input, to compute a value of the first DEOS counter; and wherein the DEOS arbiter is configured to compute the first value of the port DEOS metric responsive to the dynamic data input activity of the first set of source nodes comprises the DEOS arbiter and further configured to compute the first value of the port DEOS metric based, at least in part, on the value of the first DEOS counter.

10. The switching apparatus of claim 9, wherein the value of the first DEOS counter corresponds to a counter value selected from a group consisting of a number of data packets input, over a period of time, by the first source node into the first input port, and an amount of data input, over a period of time, by the first source node into the first input port.

11. The switching apparatus of claim 10, wherein the dynamic data input activity of the first set of source nodes into the first input port further comprises second data input to the first input port by a second source node among the first set of source nodes;

wherein the switching apparatus further comprises a second DEOS counter, the second DEOS counter associated with the second source node;

wherein the DEOS arbiter is further configured to detect the second data input and, responsive to the detecting the second data input, compute a value of a second DEOS counter; and wherein the DEOS arbiter configured to compute the first value of the port DEOS metric comprises the DEOS arbiter further configured to compute the first value of the port DEOS metric as a sum of the value of the first DEOS counter and the value of the second DEOS counter.

12. The switching apparatus of claim 1, wherein the computing system is a reconfigurable dataflow computer system that further comprises a plurality of reconfigurable processing units interconnected using a plurality of switches.

13. A computer-implemented method for arbitrating among input ports in a switch having a plurality of input ports for allocating through-connections to an output port, the method comprising:

using a Dynamic Equality of Service (DEoS) arbiter to allocate input from source nodes in response to dynamic activity or rate or amount of data input into the switch by source nodes connected to the switch, wherein the arbitration for establishing a through-connection is based on node DEOS port metrics; and wherein the node DEOS port metrics are based on DEOS counters and/or quantization ranges of DEOS counters associated with the source nodes.

14. The computer-implemented method of claim 13, wherein the DEOS arbiter includes:

computing, by the Dynamic Equality of Service (DEOS) arbiter of the switch, responsive to dynamic data input activity of a first set of source nodes inputting data into a first input port of the switch, a first value of a port DEOS metric, the first set of source nodes among a plurality of nodes of a computing system communicatively coupled to the switch, the first value of the port DEOS metric corresponding to an aggregate of the dynamic data input activity of the first set of source nodes into the first input port;

computing, by the DEOS arbiter, responsive to dynamic data input activity of a second set of source nodes inputting data into a second input port of the switch, a second value of the port DEOS metric, the second set of source nodes among the plurality of nodes, the second value of the port DEOS metric corresponding to an aggregate of the dynamic data input activity of the second set of source nodes into the second input port; and selecting, by the DEOS arbiter, in conjunction with an arbitration cycle of the switch, based on the first value of the port DEOS metric and second value of the port DEOS metric, the first input port of the switch to make a through-connection to the output port of the switch.

15. The computer-implemented method of claim 14, wherein the DEOS arbiter of the switch further comprises a round robin pointer (RRP); and wherein the DEOS arbiter is further configured to set, based on the selecting the first input port to make the through-connection, the round robin pointer to indicate the first input port selected to make the through-connection.

16. The computer-implemented method of claim 15, wherein the DEOS arbiter uses the round robin pointer (RRP) to indicate a particular input port currently using, last using, or next to use a through-connection to the output port.

17. The computer-implemented method of claim 16, wherein the DEOS arbiter selects the input port indicated by the round robin pointer (RRP) and makes a through-connection from the input port to the output port at a start of a next arbitration cycle.

18. The computer-implemented method of claim 17, wherein the DEOS arbiter uses a weighted round robin (WRR) method of arbitration, wherein the DEOS arbiter applies a respective weight to each of the input ports of the switch and grants through-connections to the input ports based on relative weights of the input ports; and wherein the through-connection to a particular input port for a number of arbitration cycles is based on a weight associated with a source node connected to the particular input port of the switch.

19. The computer-implemented method of claim 13, wherein the DEOS arbiter is for allocating among ports of switches included in a reconfigurable dataflow system having a reconfigurable host processor and an array of computing units.

20. The computer-implemented method of claim 13, wherein the DEOS arbiter comprises a processor, a memory, switch arbitration circuits, and/or firmware or software programs for executing operations for arbitrating among input ports of one or more switches included in the switch to allocate through-connections among ports of a plurality of switches included in a reconfigurable dataflow system (RDS).

* * * * *